United States Patent
Weng et al.

(10) Patent No.: US 10,795,500 B2
(45) Date of Patent: Oct. 6, 2020

(54) DISPLAY DEVICE AND DISPLAY METHOD THEREOF

(71) Applicant: InnoLux Corporation, Miao-Li County (TW)

(72) Inventors: Tsan-Po Weng, Miao-Li County (TW); Ming-Cheng Hsieh, Miao-Li County (TW); Yuan-San Hsiao, Miao-Li County (TW); Chu-Hung Tsai, Miao-Li County (TW)

(73) Assignee: INNOLUX CORPORATION, Chu-Nan, Miao-Li County (TW)

( * ) Notice: Subject to any disclaimer, the term of this patent is extended or adjusted under 35 U.S.C. 154(b) by 0 days.

(21) Appl. No.: 16/410,780

(22) Filed: May 13, 2019

(65) Prior Publication Data
US 2019/0361586 A1    Nov. 28, 2019

(30) Foreign Application Priority Data

May 24, 2018  (CN) .......................... 2018 1 0506604
Nov. 14, 2018  (CN) .......................... 2018 1 1352336

(51) Int. Cl.
*G06F 3/041*   (2006.01)

(52) U.S. Cl.
CPC .................... *G06F 3/04164* (2019.05); *G06F 2203/04101* (2013.01)

(58) Field of Classification Search
CPC .......... G06F 2203/04105; G06F 3/044; G06F 3/04164; G06F 2203/04101; G06F 3/041
See application file for complete search history.

*Primary Examiner* — Kent W Chang
*Assistant Examiner* — Chayce R Bibbee
(74) *Attorney, Agent, or Firm* — Muncy, Geissler, Olds & Lowe, P.C.

(57) ABSTRACT

A display device includes a plurality of first array electrodes, a plurality of second array electrodes, a first switch module electrically connected to the first array electrodes, a second switch module electrically connected to the second array electrodes, a first sensing module electrically connected to the second switch module, and a second sensing module electrically connected to both the first and the second switch modules. When the distance between the display device and a detected object is greater than zero, the first array electrodes receive a first touch driving signal, and the second array electrodes send a first sensing signal to the first sensing module. When the distance is equal to zero, the first array electrodes and the second array electrodes receive a second touch driving signal and send a second sensing signal to the second sensing module.

20 Claims, 12 Drawing Sheets

DISPLAY DEVICE AND DISPLAY METHOD THEREOF

BACKGROUND

1. Field of the Disclosure

The present disclosure relates to a display device and, more particularly, to a display device capable of switching between a two-dimensional touch control function and a three-dimensional touch control function and a display method thereof.

2. Description of Related Art

A typical touch display device of today can only be controlled via a user's touch or touches in a two-dimensional (2D) manner, but given the development of display devices such as automotive display panels, 2D touch control has gradually become inadequate to satisfy current user needs. While certain display devices on the market provide three-dimensional (3D) touch control, those display devices are still unsatisfactory because they are generally designed for 3D touch control alone and cannot be switched between 2D and 3D touch controls. Besides, a display device configured to sense, and be controlled by, a user's touch or touches in a 3D manner requires a plurality of sensing elements to be embedded in a peripheral region of the display panel, and yet the sensing elements increase the production cost and reduce the effective display area of the display panel. Moreover, as being mostly designed for optical sensing, 3D touch display devices are likely to be interfered by shadows and hence unable to accurately determine 3D touch control signals.

In view of the above, it is desired to develop a display device capable of solving the foregoing problems.

SUMMARY

The present disclosure provides a display device and a display method thereof, wherein the display device is provided with both 2D and 3D touch control functions.

The display device disclosed herein includes a recognition area, a first sensing module, and a second sensing module. The recognition area has a plurality of first array electrodes and a plurality of second array electrodes disposed adjacent to the first array electrodes. The first sensing module receives a first sensing signal from at least one of the second array electrodes. The second sensing module receives a second sensing signal from at least one of the first array electrodes and at least one of the second array electrodes. When a first distance between the display device and a detected object is greater than zero, the first array electrodes receive a first touch driving signal, and the second array electrodes send the first sensing signal to the first sensing module. When a second distance between the display device and the detected object is equal to zero, the first array electrodes and the second array electrodes receive a second touch driving signal and send the second sensing signal to the second sensing module.

The display method disclosed herein is performed by a display device, and includes the steps of: determining whether there is a first distance greater than zero or a second distance equal to zero between a detected object and the display surface according to distribution of electric charges on a display surface of the display device; when there is the first distance, at least one first array electrode in a recognition area of the display device receiving a first touch driving signal, and at least one second array electrode in the recognition area of the display device sending a first sensing signal to a first sensing module of the display device, wherein the at least one second array electrode is disposed adjacent to the at least one first array electrode; and when there is the second distance, the at least one first array electrode and the at least one second array electrode receiving a second touch driving signal, and the at least one first array electrode and the at least one second array electrode sending a second sensing signal to a second sensing module of the display device.

DETAILED DESCRIPTION OF THE EMBODIMENTS

Specific embodiments are described below to demonstrate how to implement the present disclosure. Based on the contents disclosed herein, a person skilled in the art can easily understand other advantages and effects of the present disclosure. The present disclosure can also be implemented or applied in ways different from those demonstrated by the embodiments, and all the details in this specification can be modified or changed to meet different points of view or applications without departing from the spirit of the present creation.

The ordinal numbers used in the specification and the appended claims such as "first" and "second" serve only to modify the claimed elements immediately after them and do not imply that such a claimed element has a counterpart with a previous or subsequent ordinal number, that there is a certain order between such claimed elements, or that such claimed elements are sequentially used in a manufacturing process. The ordinal numbers are used only to provide a clear distinction between claimed elements having the same name.

In addition, when used with reference to time, the term "when . . . " may denote "during the time that . . . ", "before . . . ", or "after . . . " and does not necessarily mean concurrence. Also, unless otherwise specified, the phrase "provided on . . . " as used herein to refer to the position of one element in relation to another does not necessarily imply contact between the two elements. Moreover, when a plurality of effects or states stated herein are joined by the conjunction "or", those effects or states may exist independently of one another, but this does not exclude the possibility that some or all of the effects may coexist; that is to say, the term "or" may be understood as "and/or". Besides, unless otherwise specified, the terms "connected", "electrically connected", and "coupled" may denote direct or indirect connection.

Figure 1:
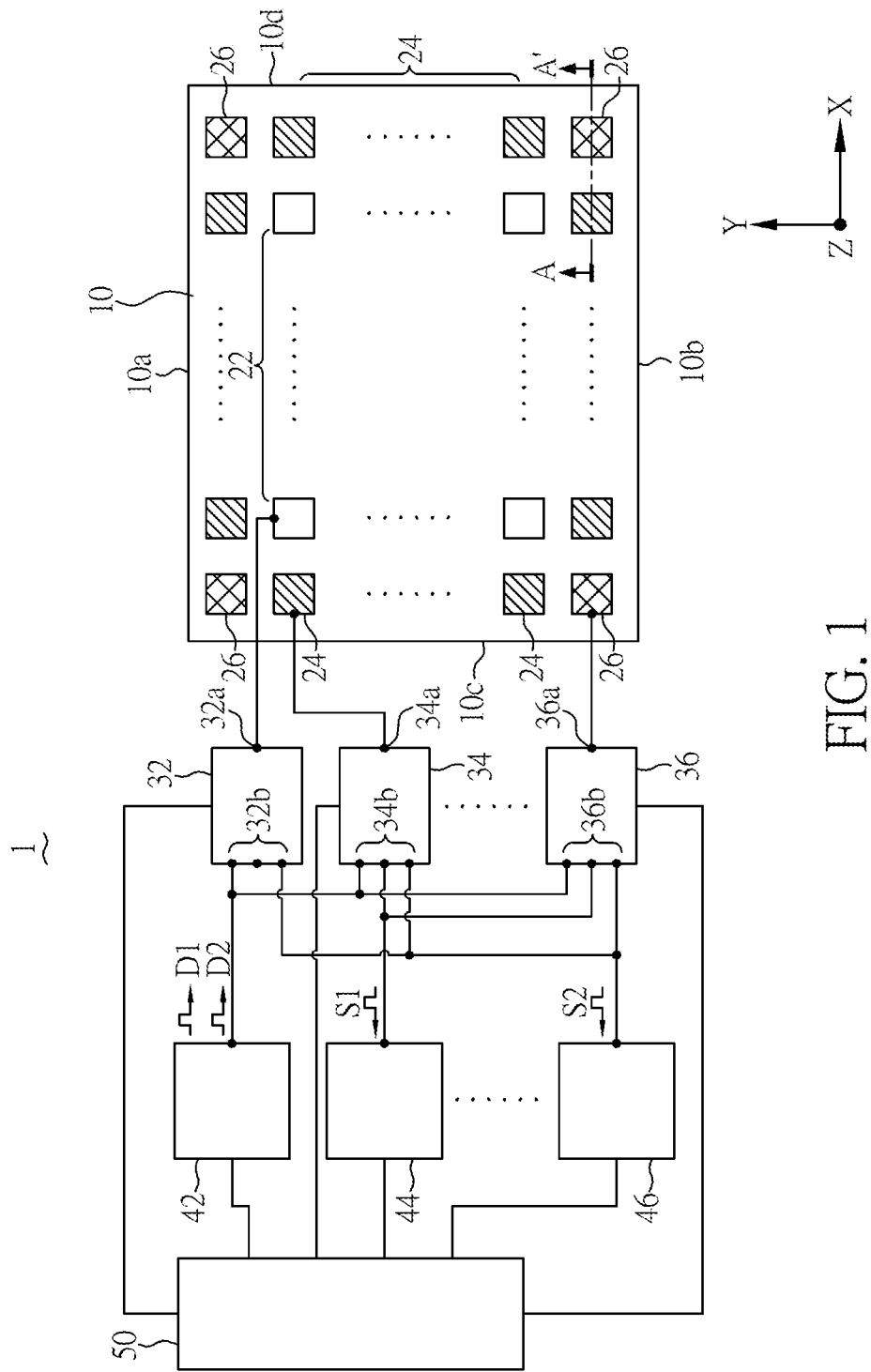
FIG. 1 is a top view of the display device according to an embodiment of the present disclosure.

FIG. 1 is a top view of the display device 1 according to an embodiment of the present disclosure, showing how the display device 1 is disposed in relation to the X direction and the Y direction. More specifically, the display device 1 is disposed on the XY plane, with the Z direction defined as the outward normal direction of the display device 1. The display device 1 has a display surface facing the Z direction. As shown in FIG. 1, the display device 1 includes a recognition area 10, a first sensing module 44, and a second sensing module 46. The recognition area 10 has a plurality of first array electrodes 22 and a plurality of second array electrodes 24. The second array electrodes 24 are disposed adjacent to the first-array electrodes 22. For example, the second array electrodes 24 may be disposed between the first array electrodes 22 and the periphery of the recognition area 10, and thus the second array electrodes 24 can be viewed as surrounding the first array electrodes 22. In one embodiment, the display device 1 further includes a first switch module 32 and a second switch module 34. The first switch module 32 is electrically connected to at least one of the first array electrodes 22. For example, the first switch module 32 may have a first end portion 32a and a second end portion 32b, and the first end portion 32a is electrically connected to at least one of the first array electrodes 22. The second switch module 34 is electrically connected to at least one of the second array electrodes 24. For example, the second switch module 34 may have a third end portion 34a and a fourth end portion 34b, and the third end portion 34a is electrically connected to at least one of the second array electrodes 24. The first sensing module 44 is electrically connected to the second switch module 34 in order to receive a first sensing signal S1 from at least one of the second array electrodes 24. The second sensing module 46 is electrically connected to both the first switch module 32 and the second switch module 34 in order to receive a second sensing signal S2 from at least one of the first array electrodes 22 and at least one of the second array electrodes 24. It is noted that the term "end portion" is not limited to a single node and may be a collective term for a plurality of nodes. In another embodiment, the first sensing module 44 and the second sensing module 46 can respectively receive the first sensing signal S1 and the second sensing signal S2 of the same at least one of the second array electrodes 24. That is, one second array electrode of the plurality of second array electrodes 24 may send the first sensing signal S1 to the first sensing module 44, and may also send the second sensing signal S2 to the second sensing module 46.

The display device 1 can be switched between a 2D touch control mode (e.g., for control via a physical touch on the device) and a 3D touch control mode (e.g., for control via a hovering touch above the device) according to the way a user touches the display device 1. The operation period of the 2D touch control mode may include a touch driving period and a touch sensing period, and the operation period of the 3D touch control mode may also include a touch driving period and a touch sensing period. When the first distance between the display surface of the display device 1 and a detected object (e.g., a user's finger) is greater than zero, the display device 1 is switched to the 3D touch control mode, in which the first array electrodes 22 receive a first touch driving signal D1 during the touch driving period and the second array electrodes 24 send a first sensing signal S1 to the first sensing module 44 during the touch sensing period. When the second distance between the display surface of the display device 1 and the detected object is equal to zero, the display device 1 is switched to the 2D touch control mode, in which the first array electrodes 22 and the second array electrodes 24 receive a second touch driving signal D2 during the touch driving period and send a second sensing signal S2 to the second sensing module 46 during the touch sensing period. In one embodiment, the touch driving period and the touch sensing period do not overlap. In addition, the first distance and the "distance" that is equal to zero may be defined along the outward normal direction (e.g., the Z direction) of the display surface of the display device 1. It is noted that the phrase "being equal to zero" encompasses such cases as the distance being zero and the existence of the distance (or gap) being hard to ascertain with the naked eye. In one embodiment, the first distance when measured along the outward normal direction of the display surface of the display device 1 is, but not limited to, greater than 0 cm and smaller than or equal to 15 cm (i.e., 0 cm<the first distance≤15 cm). In another embodiment, the upper limit of the first distance is subject to the attenuation of energy transmitted through air in the electric field between the detected object and the display surface of the display device 1. For example, the upper limit of the first distance may be increased (≥15 cm) when energy transmitted through air in the electric field is attenuated only slightly, and decreased (≤15 cm) when energy transmitted through air in the electric field is severely attenuated.

In the 3D touch control mode, the first array electrodes 22 may serve as the driving electrodes Tx for forming an electric field on the display surface when receiving the first touch driving signal D1, and the second array electrodes 24 may serve as the sensing electrodes Rx for sensing the electric field on the display surface. Thus, when a user's finger performs a 3D touch control operation over the display surface (e.g., with a hovering press, a hovering movement, or a hovering gesture), the second array electrodes 24 will detect any variation in the electric field on the display surface and then send the first sensing signal S1 to the first sensing module 44 to complete the sensing operation for 3D touch control. The sensing operation of the second array electrodes 24, however, is not limited to the above. In one embodiment, the second array electrodes 24 are configured as an integrated capacitive sensing system in which, for example, the plurality of second array electrodes 24 are series-connected as the sensing unit. In another embodiment, the second array electrodes 24 are configured as a distributed capacitive sensing system in which, for example, each of the second array electrodes 24 functions as a sensing unit to enable multi-touch control. The sensing operation for 3D touch control may alternatively involve an optical sensing system; however, the present disclosure has no limitation in this regard.

In the 2D touch control mode, both the first-array electrodes 22 and the second-array electrodes 24 may serve as the driving electrodes Tx and the sensing electrodes Rx for performing a sensing operation for 2D touch control. The first array electrodes 22 and the second array electrodes 24 may perform the sensing operation for 2D touch control in various ways, including but not limited to self-capacitive sensing, mutual-capacitive sensing, resistive sensing, and optical sensing. In one embodiment, the first touch driving signal D1 and the second touch driving signal D2 are the same signal, although they may be different from each other.

The display device 1 may include elements other than those described above. With reference to FIG. 1 again, the display device 1 may further include at least one third electrode 26 disposed adjacent to two of the second array electrodes 24. In one embodiment, each third electrode 26 is a "corner electrode" or is provided in a "corner" of the recognition area 10, wherein the term "corner" is defined with reference to the position of each third electrode 26 in the recognition area 10 in relation to the second array electrodes 24. For example, the recognition area 10 may have a first edge 10a and a second edge 10b, both extending in a first direction (defined herein as the X direction), and a third edge 10c and a fourth edge 10d, both extending in a second direction (defined herein as the Y direction), and the second array electrodes 24 are arranged along the edges 10a-10d, wherein the position between the electrode, that is one of the second array electrodes 24 arranged along the first edge 10a and is the closest to the third edge 10c, and the electrode, that is one of the second array electrodes 24 arranged along the third edge 10c and is the closest to the first edge 10a, can be viewed as a "corner" of the recognition area 10, while the third electrode 26 can be disposed in that corner. In this embodiment, the recognition area 10 has four corners, and each corner may be provided with one or more third electrodes 26. In one embodiment, and by way of example only, each third electrode 26 has a floating configuration or is configured to receive a high-impedance signal, thus forming a dummy electrode without electrical functions. In another embodiment, and by way of example only, when there is an appropriate distance between a third electrode 26 and the adjacent second array electrode 24 in the X direction or the Y direction, this appropriate distance can reduce the electric field interference between the third electrode 26 and the second array electrode 24, so that the third electrode may receive a ground signal or receive a common voltage signal in addition to being applied into a floating state or receiving a high impedance signal. In still another embodiment, and by way of example only, each third electrode 26 may serve as a driving electrode Tx or a sensing electrode Rx for receiving the first touch driving signal D1 or the second touch driving signal D2, or sending out the first sensing signal S1 or the second sensing signal S2.

In one embodiment, the display device 1 further includes a third switch module 36, and the third switch module 36 may have a fifth end portion 36a and a sixth end portion 36b. In one embodiment, the fifth end portion 36a is electrically connected to at least one third electrode 26. In one embodiment, and by way of example only, the sixth end portion 36b is electrically connected to a driving signal generation module 42, the first sensing module 44, and the second sensing module 46 or to any one or two of the above.

In one embodiment, the display device 1 further includes the driving signal generation module 42. The driving signal generation module 42 may be implemented, for example, as a circuit and be electrically connected to one or both of the second end portion 32b of the first switch module 32 and the fourth end portion 34b of the second switch module 34. In one embodiment, the 3D touch control mode is such that the driving signal generation module 42 generates the first touch driving signal D1, which is subsequently transmitted through the first switch module 32 to the first array electrodes 22, and the 2D touch control mode is such that the driving signal generation module 42 generates the second touch driving signal D2, which is subsequently transmitted through the first switch module 32 to the first array electrodes 22 and through the second switch module 34 to the second array electrodes 24. In one embodiment, the driving signal generation module 42 is also electrically connected to the sixth end portion 36b of the third switch module 36 and generates a high-impedance signal, ground signal or common voltage signal to be transmitted through the third switch module 36 to the at least one third electrode 26.

In one embodiment, the display device 1 further includes a microcontroller unit (MCU) 50. The microcontroller unit 50 may be electrically connected to the driving signal generation module 42 in order to control the driving signal generation module 42 to generate the first touch driving signal D1 or the second touch driving signal D2. The microcontroller unit 50 may also be electrically connected to the first switch module 32 and the second switch module 34 in order to turn on or off the first switch module 32 and the second switch module 34. In one embodiment, the 3D touch control mode is such that the microcontroller unit 50 turns on the first switch module 32 during the touch driving period, thereby allowing the first touch driving signal D1 to be transmitted through the first switch module 32 to the first array electrodes 22, and turns on the second switch module 34 during the touch sensing period, thereby allowing the first sensing signal S1 to be transmitted through the second switch module 34 to the first sensing module 44; and the 2D touch control mode is such that the microcontroller unit 50 turns on the first switch module 32 and the second switch module 34 during the touch driving period, thereby allowing the second touch driving signal D2 to be transmitted through the first switch module 32 to the first array electrodes 22 and through the second switch module 34 to the second array electrodes 24, and turns on the first switch module 32 and the second switch module 34 during the touch sensing period, thereby allowing the second sensing signal S2 to be transmitted through the first switch module 32 and the second switch module 34 to the second sensing module 46. The microcontroller unit 50 may also be electrically connected to the first sensing module 44 and the second sensing module 46 in order to control the operations of the first sensing module 44 and the second sensing module 46. In addition, in one embodiment, the microcontroller unit 50 is also electrically connected to the third switch module 36 in order to turn on or off the third switch module 36. In one embodiment, the driving signal generation module 42 is integrated into the microcontroller unit 50.

The detailed structure or configuration of each of the foregoing elements is described hereinafter.

Figure 2A:
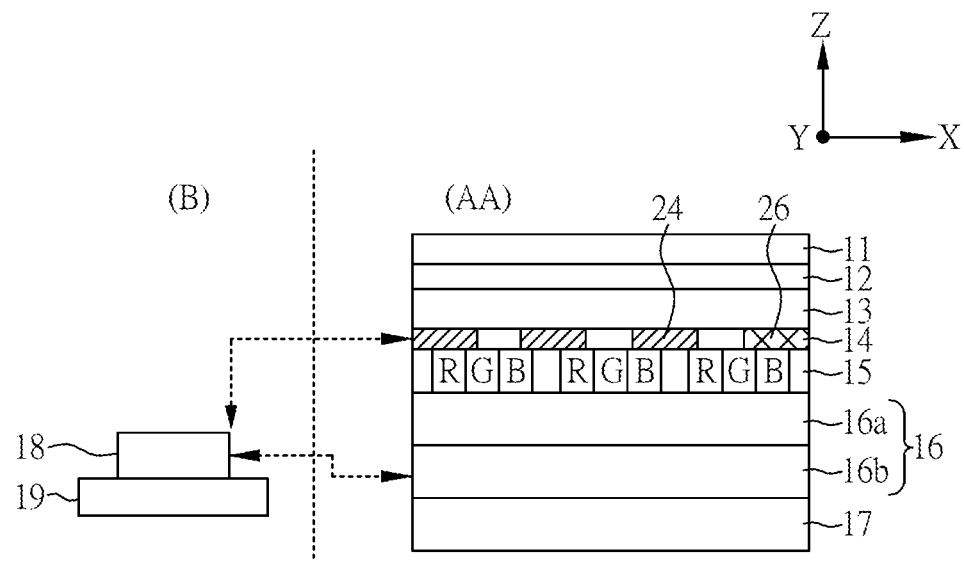
FIG. 2(A) is a sectional view taken along line A-A' across the display device in FIG. 1, in case of an on-cell configuration.
Figure 2B:
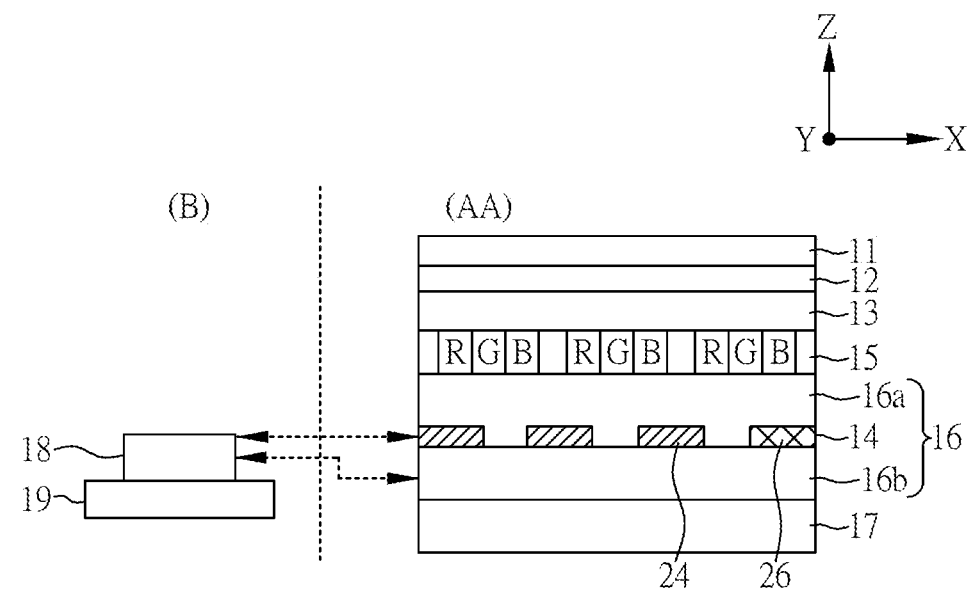
FIG. 2(B) is another sectional view taken along line A-A' across the display device 1 in FIG. 1, in case of an in-cell configuration.

At first, the recognition area 10, the first array electrodes 22, the second array electrodes 24, and the third electrodes 26 are described with reference to FIG. 1. In one embodiment, the extent of the recognition area 10 is encompassed within, or coincides with, the display area AA of the display panel (not shown) of the display device 1, with the first switch module 32, the second switch module 34, the third switch module 36, the driving signal generation module 42, the first sensing module 44, the second sensing module 46, and the microcontroller unit 50 provided in a peripheral region B of the display panel or outside the display panel. The first array electrodes 22, the second array electrodes 24, and the third electrodes 26 may have the same electrode shape. In one embodiment, however, the first array electrodes 22, the second array electrodes 24, and the third electrodes 26 are of free shapes respectively. In other words, the first array electrodes 22, the second array electrodes 24, and the third electrodes 26 may be designed respectively into different shapes to correspond to the shape of the display device 1, the display panel, or the recognition area 10 (see FIG. 6(A)). In addition, the display device 1 disclosed herein may use an on-cell or in-cell touch panel configuration. When an on-cell configuration is used, the first array electrodes 22, the second array electrodes 24, and the third electrodes 26 may be provided on the outer side of the color filter layer, as shown in FIG. 2(A). When an in-cell configuration is used, the first array electrodes 22, the second array electrodes 24, and the third electrodes 26 may be provided directly in the display array substrate, as shown in FIG. 2(B). It is to be noted that the stacked structures in FIGS. 2(A) and 2(B) are merely illustrative and not intended to limit the present disclosure in any way.

FIG. 2(A) is a sectional view taken along line A-A' across the display device 1 in FIG. 1, in case of an on-cell configuration. As shown in FIG. 2(A), the display device 1 may include a cover layer 11 (which may be but is not limited to a cover plate 11), an adhesive layer 12, a first polarization layer 13, an array electrode layer 14 (which may include the first array electrodes 22, the second array electrodes 24, and the third electrodes 26), a color filter layer 15, a display array layer 16, and a second polarization layer 17. In the normal direction (i.e., the Z direction) of the display device 1, the cover layer 11 may be disposed on the adhesive layer 12, the adhesive layer 12 may be disposed on the first polarization layer 13, the first polarization layer 13 may be disposed on the color filter layer 15 in which a plurality of array electrodes 14 are disposed on one side of the color filter layer 15 that faces the first polarization layer 13, the color filter layer 15 may be disposed on the display array layer 16, and the display array layer 16 may be disposed on the second polarization layer 17. The cover layer 11 may be made of transparent material but is not limited thereto. The adhesive layer 12 may be, but is not limited to, an optical clear adhesive (OCA) or an optical clear resin (OCR). The first polarization layer 13 and the second polarization layer 17 may be made of any suitable material. The array electrodes 14 may be electrically connected to a control chip 18 provided in the peripheral region B, wherein the control chip 18 may include such elements as the microcontroller unit 50 and be disposed on, for example, a flexible printed circuit board 19. The color filter layer 15 may include, for example, a red color layer R, a blue color layer B, and a green color layer G and have a light shielding region (not shown); however, the present disclosure has no limitation in this regard. The display array layer 16 may include liquid crystals (LCs), a transparent electrode layer (e.g., indium tin oxide (ITO) or indium zinc oxide (IZO)), a passivation layer, and an alignment layer (e.g., polyimide (PI)), thereby forming an LC layer 16*a* and a thin film transistor (TFT) array 16*b*, for example.

In addition, although this embodiment is demonstrated by using an LC panel structure as an example, the present disclosure is also applicable to a flexible display panel structure, a non-rectangular display panel structure, an organic light emitting diode (OLED) panel structure, an inorganic light emitting diode (LED) panel structure (for example, Mini LED or Micro LED panel structure), a quantum-dot panel structure, or a tiled display composed of an arbitrary combination of the above panel structures of the same type or different types. In an embodiment applied to a non-liquid crystal panel structure, the liquid crystal layer may be replaced by the above exemplary light emitting diode or other display medium, and at least one of the alignment layer, the color filter layer, the first polarization layer, the second polarization layer and the backlight module may be selectively omitted or the layers may be added or omitted according to the design requirement. Other embodiments described below are also applicable to the other panel structures described above.

FIG. 2(B) is another sectional view taken along line A-A' across the display device 1 in FIG. 1, in case of an in-cell configuration instead. As shown in FIG. 2(B), the display device 1 may include a cover layer 11 (which may be but is not limited to a cover plate), an adhesive layer 12, a first polarization layer 13, a color filter layer 15, a display array layer 16, a second polarization layer 17, and a plurality of array electrodes 14 disposed on the display array layer 16, wherein the array electrodes 14 may include the first array electrodes 22, the second array electrodes 24, and the third electrodes 26. In the normal direction (i.e., the Z direction) of the display device 1, the cover layer 11 may be disposed on the adhesive layer 12, the adhesive layer 12 may be disposed on the first polarization layer 13, the first polarization layer 13 may be disposed on the color filter layer 15, the color filter layer 15 may be disposed on the display array layer 16, and the display array layer 16 may be disposed on the second polarization layer 17. The cover layer 11, the adhesive layer 12, the first polarization layer 13, the second polarization layer 17, the color filter layer 15, and the display array layer 16 are the same as described above with reference to FIG. 2(A) and therefore a detailed description therefor is deemed unnecessary. The array electrodes 14 (including the first array electrodes 22, the second array electrodes 24, and the third electrodes 26) are disposed on the TFT array 16*b* of the display array layer 16. The array electrodes 14 may serve as common electrodes or pixel electrodes. The array electrodes 14 or the TFT array 16*b* may be electrically connected to a control chip 18 disposed on, for example, a flexible printed circuit board 19.

Figure 2C:
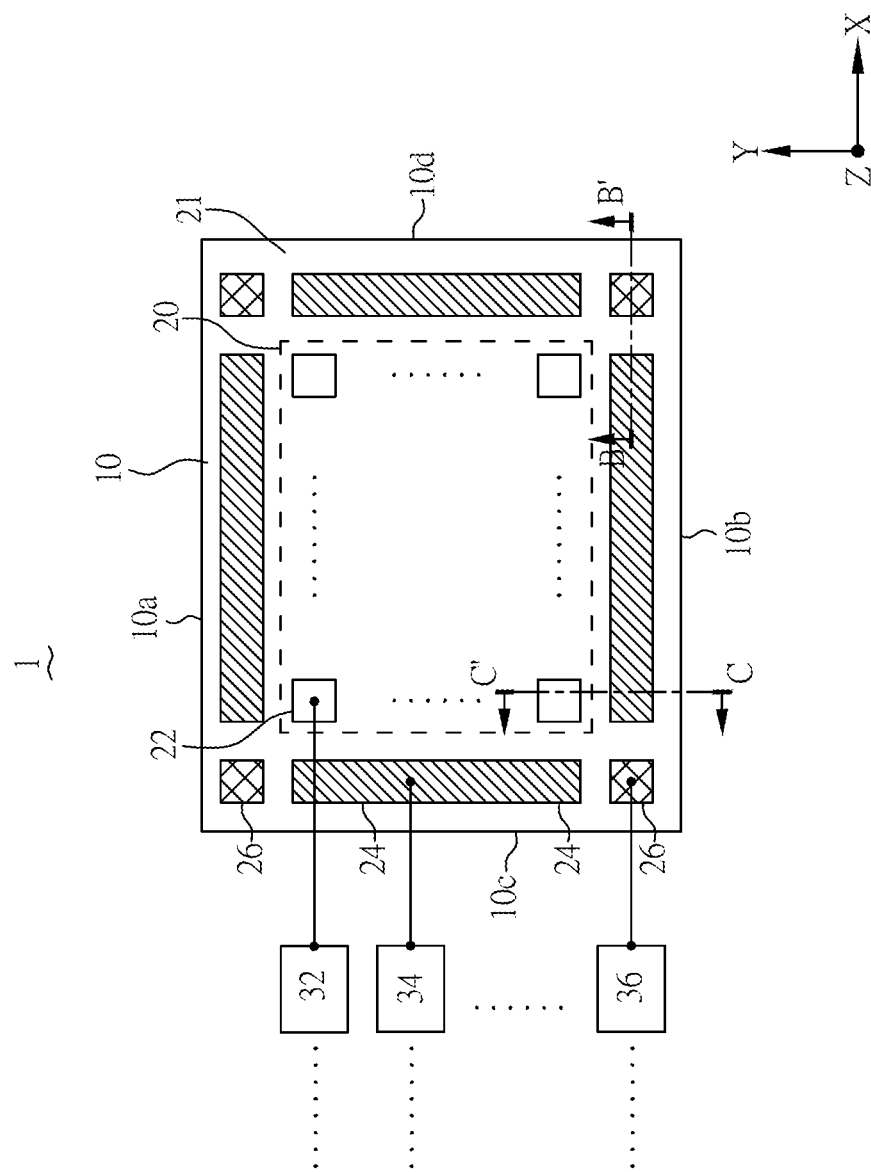
FIG. 2(C) is a top view of the display device according to another embodiment of the present disclosure.

The display device 1 of the present disclosure may also have different structures. For example, the first array electrode 22 and the second array electrode 24 may be respectively disposed on different electrode layers, so as to reduce the interference between the first array electrode 22 and the second array electrode 24, where the interference may be electrical field coupling. FIG. 2(C) is a top view of the display device 1 according to another embodiment of the present disclosure, wherein the display device 1 of this embodiment is placed in the same manner as the embodiment of FIG. 1. In addition, if the elements of this embodiment are the same as those of FIG. 1, they are denoted by the same element symbols and, since the details of the elements have been described in the embodiment of FIG. 1, a detailed description therefor is omitted.

As shown in FIG. 2(C), the first array electrodes 22 of the display device 1 are disposed in a driving array area 20, and the second array electrodes 24 and the third electrodes 26 are disposed in a sensing array area 21, i.e., the remaining area obtained by deducting driving array area 20 from the recognition area 10. The driving array area 20 and the sensing array area 21 may have different height positions in the normal direction (Z direction) of the display device 1, wherein the "height position" corresponds to the position in the Z direction, and thus the first array electrodes 22 and the second array electrodes 24 (or the third electrodes 26) are respectively disposed at different positions in the Z direction. In addition, the first array electrodes 22 may be connected to the first switch module 32, and the first array electrodes 22 and the first switch module 32 are applicable to the description in the embodiment of FIG. 1, for example, the connection of the first switch module 32 and other components. The second array electrodes 24 may be connected to the second switch module 34, and the second array electrodes 24 and the second switch module 34 are applicable to the description in the embodiment of FIG. 1, for example, the connection of the second switch module 34 and other components. The third electrodes 26 may be connected to the third switch module 36, and the third electrodes 26 and the third switch module 36 are applicable to the description in the embodiment of FIG. 1, for example, the connection of the third switch module 36 and other components.

Furthermore, in FIG. 2(C), each of the second array electrodes 24 is presented as a strip electrode, but in other embodiments, each of the second array electrodes 24 may also be presented by that of the embodiment in FIG. 1, i.e., each strip electrode being modified into a plurality of electrodes. By way of example only, when each of the second array electrodes 24 is presented as a strip electrode, as shown in FIG. 2(C), the second array electrodes 24 may be used to detect the hovering touch of one hand (for example, the gesture of one hand) and, when each of the second array electrodes 24 is modified to be presented as a plurality of electrodes, the second array electrodes 24 may be used to detect the hovering touch of the two hands (for example, the gesture of two hands).

In addition, although there are third electrodes 26 schematically illustrated in FIG. 2(C), the third electrodes however may be removed in other embodiments, and the positions where the third electrodes 26 are removed may be placed with the second array electrodes 24 or the positions where the third electrodes 26 are removed are left blank, while it is not limited thereto. Moreover, in an embodiment, the third electrode 26 may be applied to be in a floating state or may receive a high impedance signal and, in another embodiment, the third electrode 26 may also be used as a sensing electrode (Rx), i.e., used as the second array electrode 24. In another embodiment, and by way of example only, when there is an appropriate distance between a third electrode 26 and the adjacent second array electrode 24 in the X direction or the Y direction, the appropriate distance can reduce the electric field interference between the third electrode 26 and the second array electrode 24, so that the third electrode may receive a ground signal or receive a common voltage signal in addition to being applied into a floating state or receiving a high impedance signal.

Furthermore, when the display device 1 is viewed in the normal direction, the second array electrodes 24 do not overlap with the first array electrodes 22. For example, the first array electrodes 22 are disposed in a range extending outward from the center of the recognition area 10, and the second array electrodes 24 are disposed in the area between the range and the periphery of the recognition area 10. Therefore, the first array electrodes 22 and the second array electrodes 24 do not overlap when viewed from the normal direction (Z direction), while it is are not limited thereto.

In order to clearly illustrate the detailed structure of the display device 1 of FIG. 2(C), the following description will be made with the embodiment of FIG. 2(D), wherein FIG. 2(D) (left side) is a sectional view taken along line B-B' across the display device 1 in FIG. 2(C), in case of an on-cell configuration.

Figure 2D:
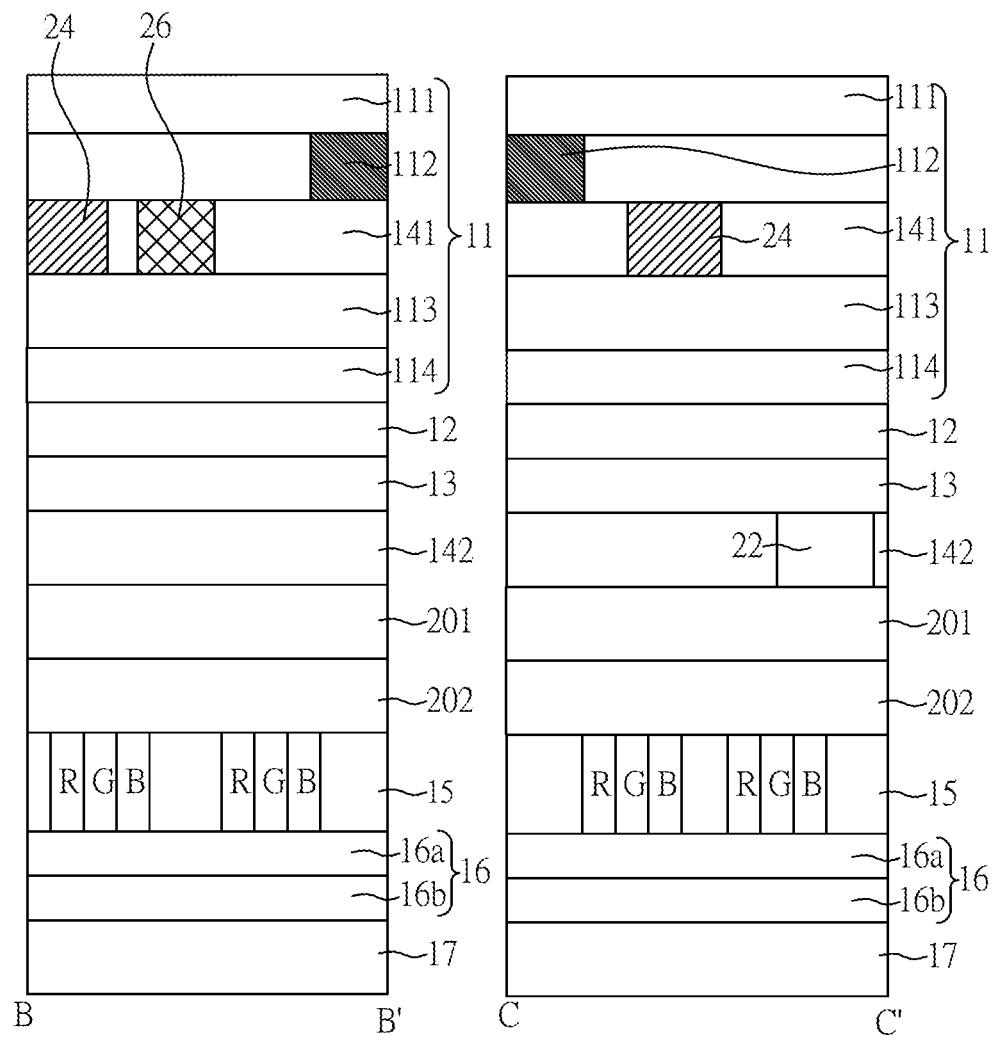
FIG. 2(D) is a sectional view taken along lines B-B' and C-C' across the display device in FIG. 2(C), in case of an on-cell configuration.

As shown in the right side of FIG. 2(D), the display device 1 may include a cover layer 11. The cover layer 11 of this embodiment may include a protective layer 111, a first light shielding layer 112, a sensing electrode layer 141, and a first oxide layer 113 and a first metal layer 114, or at least one of the above layers. In the Z direction, the cover layer 11 may be further disposed on the topmost layer of an adhesive layer 12, a first polarization layer 13, a driving electrode layer 142, a second oxide layer 201, a second metal layer 202, a color filter layer 15, a display array layer 16 (including a liquid crystal layer 16a and a thin film transistor array 16b), and a second polarization layer 17. In the Z direction, the cover layer 11 is disposed at the top of the display device 1. In an embodiment, the cover layer 11 may be a cover plate but, in another embodiment, the cover layer 11 may be the topmost structure of a flexible panel. In an embodiment, the protective layer 111 in the cover layer 11 has a transmittance of about 70% or more for visible light, while it is not limited thereto. In an embodiment, the protective layer 111 has a transmittance of 80% or more for visible light. In another embodiment, the protective layer 111 has a transmittance of 90% or more for visible light; that is, only 10% or less of light may be reflected or refracted. In an embodiment, the protective layer 111 may be a transparent cover plate. In an embodiment, the material of the protective layer 111 may be, for example, a barrier film, a glass structure, an IOI (Inorganic-Organic-Inorganic) multi-layers package structure, etc., or may be, for example, various antifouling or scratch resistant structures, while the disclosure is not limited thereto. In addition, in the normal direction (Z direction), the cover layer 11 may be disposed on the adhesive layer 12, wherein the protective layer 111 is disposed on the first light shielding layer 112, the first light shielding layer 112 is disposed on the sensing electrode layer 141. the sensing electrode layer 141 is disposed on the first oxide layer 113, the first oxide layer 113 is disposed on the first metal layer 114, and the first metal layer 114 is disposed on the adhesive layer 12. In other words, in the normal direction (Z direction), the protective layer 111 can be regarded as the topmost end of the display device 1, and the sensing electrode layer 141 is disposed between the protective layer 111 and the driving electrode layer 142 (that is, the sensing electrode layer 141 is closer to the protective layer 111 than the driving electrode layer 142). In other words, the sensing electrode layer 141 is an electrode layer close to the protective layer 111, and the driving electrode layer 142 is an electrode layer away from the protective layer 111. Furthermore, the adhesive layer 12 may be disposed on the first polarization layer 13, the first polarization layer 13 may be disposed on the driving electrode layer 142, the driving electrode layer 142 may be disposed on the second oxide layer 201, the second oxide layer 201 may be disposed on the second metal layer 202, the second metal layer 202 may be disposed on the color filter layer 15, the color filter layer 15 may be disposed on the display array layer 16, and the display array layer 16 may be disposed on the second polarization layer 17. The details of the adhesive layer 12, the first polarization layer 13, the color filter layer 15, the display array layer 16, and the second polarization layer 17 are applicable to the description of FIG. 2(A), and thus are not described in detail. Hereinafter, the protective layer 111, the first light shielding layer 112, the sensing electrode layer 141, the first oxide layer 113, the first metal layer 114, the driving electrode layer 142, the second oxide layer 201, and the second metal layer 202 will be described.

With the existent technique of arranging metal lines on the protective layer 111, the second array electrodes 24, serving as sensing electrodes (Rx), may be disposed on the protective layer 111. The first light shielding layer 112 may be formed, for example, of a photoresist material, and is mainly disposed at the periphery of the recognition area 10 as shown in FIG. 2(C) so as to reduce light leakage at the periphery of the recognition area 10. Alternatively, if the material of the first shielding layer 112 is of water absorptivity, the first light shielding layer 112 can prevent moisture from entering the recognition area 10. In one embodiment, in the normal direction (Z direction), the maximum thickness of the first light shielding layer 112 is between 1 and 3 micrometers (um) (i.e., 1 um≤maximum thickness of the first light shielding layer 112≤3 um). The sensing electrode layer 141 may include the second array electrodes 24, wherein the second array electrode 24 may serve as a sensing electrode (Rx). The second array electrode 24 may be formed by, for example, a transparent electrode (ITO or IZO), a metal layer (for example, a suitable metal material such as copper or aluminum), or a multilayer material stacking of insulation/metal/insulation layer (for example, material stacking of titanium/aluminum/titanium, molybdenum/aluminum/molybdenum, and the like), while it is not limited thereto. In one embodiment, the third electrode 26 may also be disposed in the sensing electrode layer 141 and may serve as a dummy electrode or a sensing electrode (Rx) based on the requirement. In one embodiment, in the normal direction (Z direction), the maximum thickness of the sensing electrode layer 141 is between 20 and 800 nanometers (nm) (i.e., 20 nm≤maximum thickness of the sensing electrode layer 141≤800 nm). The first oxide layer 113 may be formed, for example, of a photoresist material for protecting the first metal layer 114, while it is is not limited thereto. In one embodiment, in the normal direction (Z direction), the maximum thickness of the first oxide layer 113 is between 1 and 3 micrometers (um) (i.e., 1 um≤maximum thickness of the first oxide layer 113≤3 um). The first metal layer 114 is electrically connected to the sensing electrode layer 141, and is connected to the second switch module 34 or the third switch module 36, thereby forming an electrical connection between the second array electrodes 24 and the second switch module 34 or an electrical connection between the third array electrodes 26 and the third switch module 36. In one embodiment, the first metal layer 114 may be connected to the second array electrodes 24 or the third array electrodes 26 through the vias in the first oxide layer 113, and the first metal layer 114 may be electrically connected to the second switch module 34 or the third switch module 36 through conductive wires, while the disclosure is not limited thereto. In addition, the size of the first metal layer 114 in the X direction may be reduced. For example, the size of the first metal layer 114 in FIG. 2(D) may be reduced in the X direction to correspond to the second array electrode 24, while remaining portion of the layer is in the X direction (i.e., the portion of the layer after the first metal layer 114 is subtracted) may be filled with an oxide (for example, first oxide layer 113). In one embodiment, the first metal layer 114 may be formed of, for example, molybdenum (Mo), nitride of molybdenum (MoNx), aluminum (Al), or copper (Cu), while it is not limited thereto. In one embodiment, in the normal direction (Z direction), the maximum thickness of the first metal layer 114 is between 150 and 500 nanometers (nm) (i.e., 150 nm≤maximum thickness of the first metal layer 114≤500 nm).

In addition, in another embodiment, as long as the process technology permits, the first light shielding layer 112 and the second array electrode 24 or the third array electrode 26 may be placed in the same layer in the normal direction (Z direction) of the display device 1, or placed approximately at the same height position (coplanar) with respect to the Z axis.

Furthermore, the drive electrode layer 142 may include a first array electrode 22 (shown as a sectional view taken along lines C-C' across the display device in FIG. 2(C)). In one embodiment, in the normal direction (Z direction), the maximum thickness of the driving electrode layer 142 is between 20 and 800 nanometers (nm) (i.e., 20 nm≤maximum thickness of the driving electrode layer 142≤800 nm). The second oxide layer 201 may be formed, for example, of a photoresist material for protecting the second metal layer 202, while it is not limited thereto. In one embodiment, in the normal direction (Z direction), the maximum thickness of the second oxide layer 201 is between 1 and 3 micrometers (um) (i.e., 1 um≤maximum thickness of the second oxide layer 201≤3 um). The second metal layer 202 is electrically connected to the driving electrode layer 142, and is electrically connected to the first switch module 32, thereby forming an electrical connection between the first array electrodes 22 and the first switch module 32. In one embodiment, the second metal layer 202 is electrically connected to the first array electrodes 22 through the vias (not shown) in the second oxide layer 201, and the second metal layer 202 is electrically connected to the first switch module 32 through the conductive wires, while the disclosure is not limited thereto. In addition, the size of the second metal layer 202 in the Y direction may be reduced. For example, the size of the second metal layer 202 in the right side of FIG. 2(D) may be reduced in the Y direction to correspond to the first array electrode 22, while the remaining portion of the layer in the Y direction (i.e., the portion of the layer after the second metal layer 202 is subtracted) may be filled with an oxide (for example, the second oxide layer 201). In one embodiment, the second metal layer 202 may be formed of, for example, molybdenum (Mo), nitride of molybdenum (MoNx), aluminum (Al) or copper (Cu), while it is not limited thereto. In one embodiment, in the normal direction (Z direction), the maximum thickness of the second metal layer 202 is between 150 and 500 nanometers (nm) (i.e., 150 nm≤maximum thickness of the second metal layer 202≤500 nm).

Therefore, it can be seen that the second array electrodes 24 and the first array electrodes 22 can be disposed in different electrode layers, so as to reduce the interference (for example, electric field interference) between the two.

The aforementioned stacking structure is for illustrative purpose only and not intended to be limiting of the disclosure. For example, the positions of the first metal layer 114 and the sensing electrode layer 141 in the normal direction (Z direction) may be interchanged according to the requirement, or the positions of the second metal layer 202 and the driving electrode layer 142 in the normal direction (Z direction) may be interchanged according to the requirement.

The thickness of the layer (or element) may be measured by, for example, a scanning electron microscope (SEM), a transmission electron microscope (TEM), or a scanning transmission electron microscope (STEM) or the like. By taking the scanning electron microscope (SEM) as an example, the scanning electron microscope (SEM) can take an SEM image of a cross-sectional view of a particular layer (element), wherein, if appropriate, the range of the local area image width and/or thickness of the SEM image is not particularly limited, and thus the width and/or thickness of the image can be adjusted according to the thickness of the actual layer (element). The scanning electron microscope (SEM) may define the thickness of the layer (or component) by measuring the maximum thickness of the particular layer (element) in the SEM image, or performing a measurement through other suitable measurement methods.

FIG. 2(D) (right side) is a sectional view taken along line C-C' across the display device in FIG. 2(C), in case of an on-cell configuration. As shown in the right side FIG. 2(D), in the Z direction, the layers are arranged in the same manner as in the right side of FIG. 2(D). Furthermore, the driving electrode layer 142 may include the first array electrodes 22, wherein the first array electrode 22 may serve as a driving electrode (Tx). The first array electrode 24 may be formed by, for example, a transparent electrode (ITO or IZO), a metal layer (for example, a suitable metal material such as copper or aluminum), or a multilayer material stacking of insulation/metal/insulation layer (for example, material stacking of titanium/aluminum/titanium, molybdenum/aluminum/molybdenum, and the like), while it is not limited thereto. Furthermore, since there is a space in parallel to the Y direction between the second array electrodes 24 and the first array electrodes 22, it is known that the second array electrodes 24 and the first array electrodes 22 do not overlap when viewed in the Z direction.

With reference to FIG. 1, FIG. 2(C), FIG. 3(A) and FIG. 3(B), the detailed structures of the first switch module 32, the second switch module 34 and the third switch module 36 will be described hereinafter.

Figure 3A:
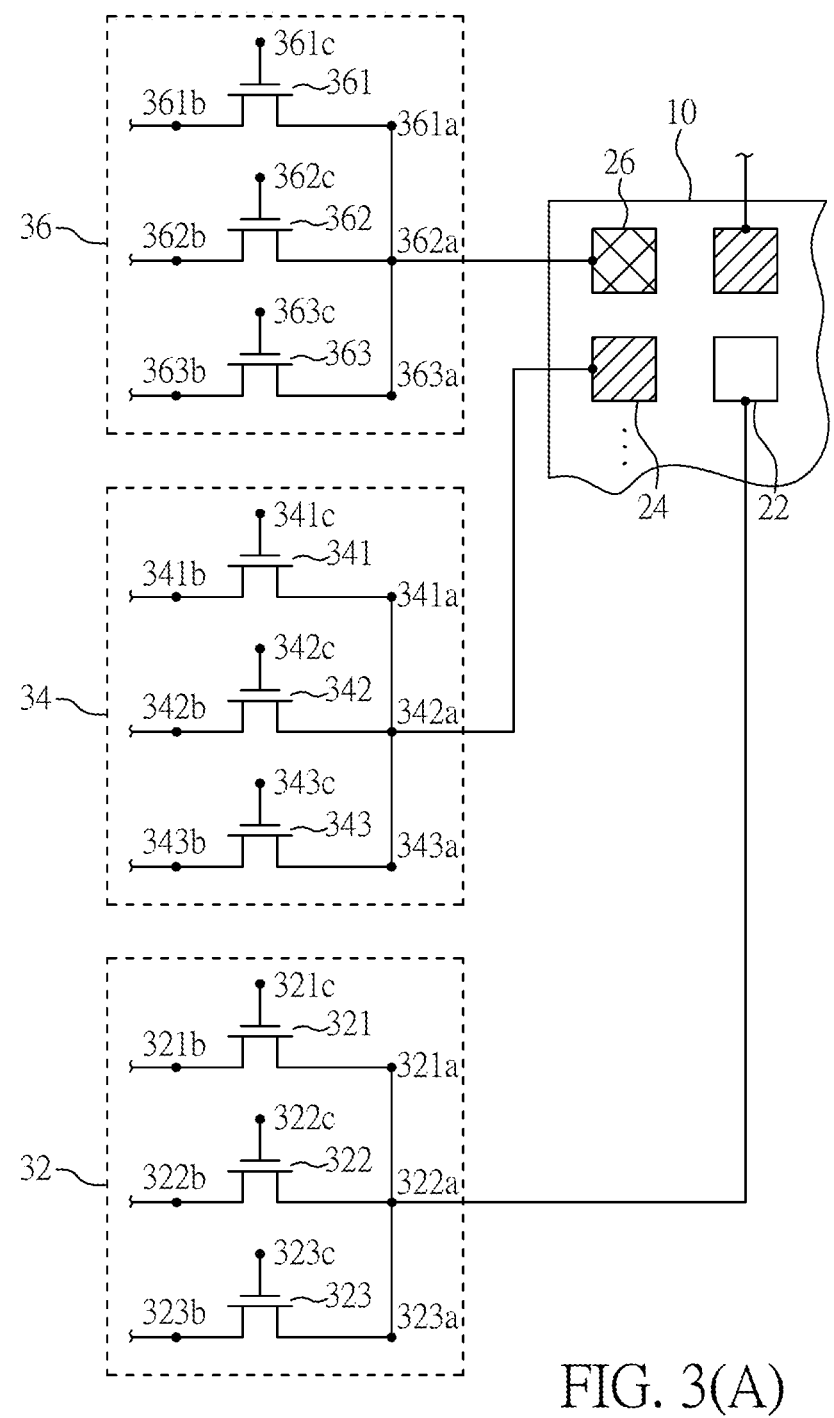
FIG. 3(A) schematically shows the first switch module, the second switch module, and the third switch module according to an embodiment of the present disclosure.

FIG. 3(A) schematically shows the first switch module 32, the second switch module 34, and the third switch module 36 according to an embodiment of the present disclosure. Please also refer to FIG. 1. It should be noted that the number of the switch elements in FIG. 3(A) has been reduced for the sake of simplicity and facilitating understanding of the drawing. In practice, the present disclosure may employ more switch elements, such as a plurality of first switch modules 32, a plurality of second switch modules 34, and a plurality of third switch modules 36. Moreover, a single first switch module 32 may be connected to a signal first-array electrode 22 or a plurality of first-array electrodes 22, a single second switch module 34 may be connected to a single second array electrode 24 or a plurality of second array electrodes 24, and a single third switch module 36 may be connected to a single third electrode 26 or a plurality of third electrodes 26.

As shown in FIG. 3(A), the first switch module 32 may include a first transistor 321, a second transistor 322, and a third transistor 323. The first transistor 321 has a first end 321a, a second end 321b, and a control end 321c. The second transistor 322 has a first end 322a, a second end 322b, and a control end 322c. The third transistor 323 has a first end 323a, a second end 323b, and a control end 323c.

In one embodiment, each first end (321a, 322a, 323a) of the first switch module 32 is electrically connected to at least one of the first array electrodes 22. In another embodiment, the first switch module 32 is not provided with the second transistor 322. The second switch module 34 may include a fourth transistor 341, a fifth transistor 342, and a sixth transistor 343. The fourth transistor 341 has a first end 341a, a second end 341b, and a control end 341c. The fifth transistor 342 has a first end 342a, a second end 342b, and a control end 342c. The sixth transistor 343 has a first end 343a, a second end 343b, and a control end 343c. In one embodiment, each first end (341a, 342a, 343a) of the second switch module 34 is electrically connected to at least one of the second array electrodes 24. The third switch module 36 may include a seventh transistor 361, an eighth transistor 362, and a ninth transistor 363. The seventh transistor 361 has a first end 361a, a second end 361b, and a control end 361c. The eighth transistor 362 has a first end 362a, a second end 362b, and a control end 362c. The ninth transistor 363 has a first end 363a, a second end 363b, and a control end 363c. In one embodiment, each first end (361a, 362a, 363a) of the third switch module 36 is electrically connected to at least one of the third electrodes 26. In one embodiment, the first ends 321a, 322a, and 323a of the first switch module 32 are referred to collectively as the first end portion 32a of the first switch module 32, the second ends 321b, 322b, and 323b of the first switch module 32 are referred to collectively as the second end portion 32b of the first switch module 32, and the third end portion 34a of the second switch module 34 to the sixth end portion 36b of the third switch module 36 are defined in a similar manner. It is noted that the number of the transistors described above is only exemplary but not limiting.

Figure 3B:
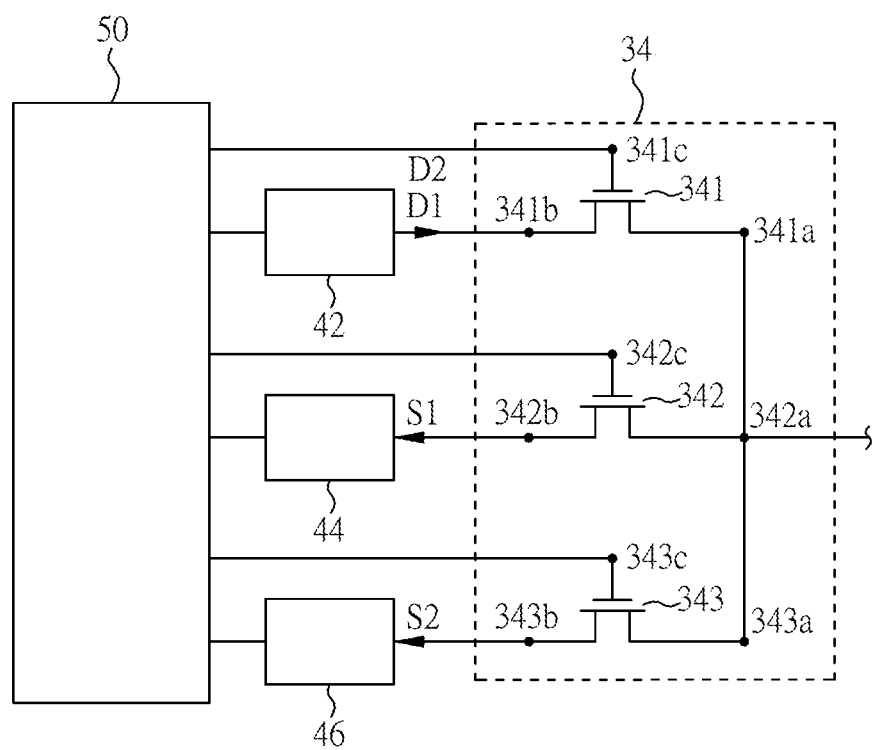
FIG. 3(B) schematically shows the second switch module, the driving signal generation module, the first sensing module, the second sensing module, and the microcontroller according to an embodiment of the present disclosure.

Please refer to FIG. 3(B) in conjunction with FIG. 1. FIG. 3(B) schematically shows the second switch module 34, the driving signal generation module 42, the first sensing module 44, the second sensing module 46, and the microcontroller unit 50 according to an embodiment of the present disclosure. To facilitate description, FIG. 3(B) shows only the second switch module 34, while the way the third switch module 36 is connected to the driving signal generation module 42, the first sensing module 44, the second sensing module 46, and the microcontroller unit 50 can be understood through the example of FIG. 3(B). The first switch module 32 is connected in a manner similar to that shown in FIG. 3(B), except that the second end 322b of the second transistor 322 of the first switch module 32 is not electrically connected to the first sensing module 44, the microcontroller unit 50, or both the first sensing module 44 and the microcontroller unit 50, or that the first switch module 32 is not provided with the second transistor 322.

As shown in FIG. 3(B), the second end 341b of the fourth transistor 341 may be electrically connected to the driving signal generation module 42; the second end 342b of the fifth transistor 342 may be electrically connected to the first sensing module 44; the second end 343b of the sixth transistor 343 may be electrically connected to the second sensing module 46; and the control end 341c of the fourth transistor 341, the control end 342c of the fifth transistor 342, and the control end 343c of the sixth transistor 343 may be electrically connected to the microcontroller unit 50. Thus, the fourth transistor 341, the fifth transistor 342 and the sixth transistor 343, all of which are electrically connected to the first array electrodes 22, may be turned on at different time points respectively under the control of the microcontroller unit 50. For example, the fourth transistor 341 may be turned on during the touch driving period for 2D or 3D touch control, the fifth transistor 342 may be turned on during the touch sensing period for 3D touch control, and both the fifth transistor 342 and the sixth transistor 343 may be turned on during the touch sensing period for 2D touch control, while the disclosure is not limited thereto.

In one embodiment, the first switch module 32 is connected in a manner similar to that shown in FIG. 3(B). For example, the second end 321b of the first transistor 321 may be electrically connected to the driving signal generation module 42, the second end 323b of the third transistor 323 may be electrically connected to the second sensing module 46, and the control end 321c of the first transistor 321 and the control end 323c of the third transistor 323 may be electrically connected to the microcontroller unit 50. In one embodiment, the third switch module 36 is connected in the same manner as shown in FIG. 3(B). For example, the second end 361b of the seventh transistor 361 may be electrically connected to the driving signal generation module 42; the second end 362b of the eighth transistor 362 may be electrically connected to the first sensing module 44; the second end 363b of the ninth transistor 363 may be electrically connected to the second sensing module 46; and the control end 361c of the seventh transistor 361, the control end 362c of the eighth transistor 362, and the control end 363c of the ninth transistor 363 may be electrically connected to the microcontroller unit 50.

The structural details of the first sensing module 44, the second sensing module 46, and the microcontroller unit 50 are described below with reference to FIG. 1 to FIG. 3(D).

Figure 3C:
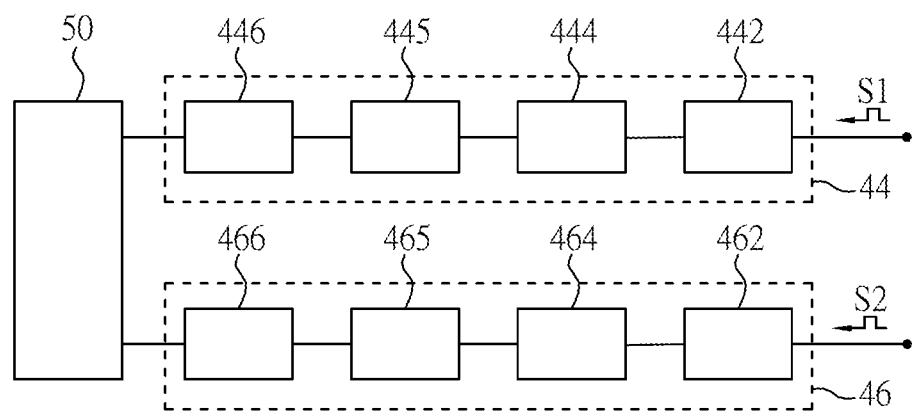
FIG. 3(C) schematically shows the first sensing module and the second sensing module according to an embodiment of the present disclosure.

FIG. 3(C) schematically shows the first sensing module 44 and the second sensing module 46 according to an embodiment of the present disclosure. As shown in FIG. 3(C), the first sensing module 44 may include a first analog front end (AFE) circuit 442, a first analog-to-digital converter (ADC) 444, a first register 445, and a first arithmetic logic unit (ALU) 446. The first AFE circuit 442 may be electrically connected to the first ADC 444, the first ADC 444 may be electrically connected to the first register 445, the first register 445 may be electrically connected to the first ALU 446, and the first ALU 446 may be electrically connected to the microcontroller unit 50. In one embodiment, the first AFE circuit 442 receives the first sensing signal S1 from the second array electrodes 24 and sends the first sensing signal S1 to the first ADC 444. The first ADC 444 then converts the first sensing signal S1 from an analog format to a digital one, and sends the converted first sensing signal S1 to the first register 445 for temporary storage so that the first ALU 446 may calculate the location of the 3D touch. The second sensing module 46 may include a second AFE circuit 462, a second ADC 464, a second register 465, and a second ALU 466. The second AFE circuit 462 may be electrically connected to the second ADC 464, the second ADC 464 may be electrically connected to the second register 465, the second register 465 may be electrically connected to the second ALU 466, and the second ALU 466 may be electrically connected to the microcontroller unit 50. In one embodiment, the second AFE circuit 462 receives the second sensing signal S2 from the first array electrodes 22 and the second array electrodes 24, and sends the second sensing signal S2 to the second ADC 464. The second ADC 464 then converts the second sensing signal S2 from an analog format to a digital one, and sends the converted second sensing signal S2 to the second register 465 for temporary storage so that the second ALU 466 may calculate the location of the 2D touch.

In one embodiment, the first AFE circuit 442 and the second AFE circuit 462 are integrated as a single unit to perform, for example, the function of the first AFE circuit 442 in response to a user operation for 3D touch control, and perform the function of the second AFE circuit 462 in response to a user operation for 2D touch control. Similarly, the first ADC 444 and the second ADC 464 may be integrated as a single unit, the first register 445 and the second register 465 may be integrated as a single unit, and the first ALU 446 and the second ALU 466 may be integrated as a single unit. In one embodiment, the first ALU 446 and the second ALU 466 are integrated into the microcontroller unit 50. Each of the first sensing module 44 and the second sensing module 46 may include more or less elements than described above, while the disclosure is not limited thereto.

Figure 3D:
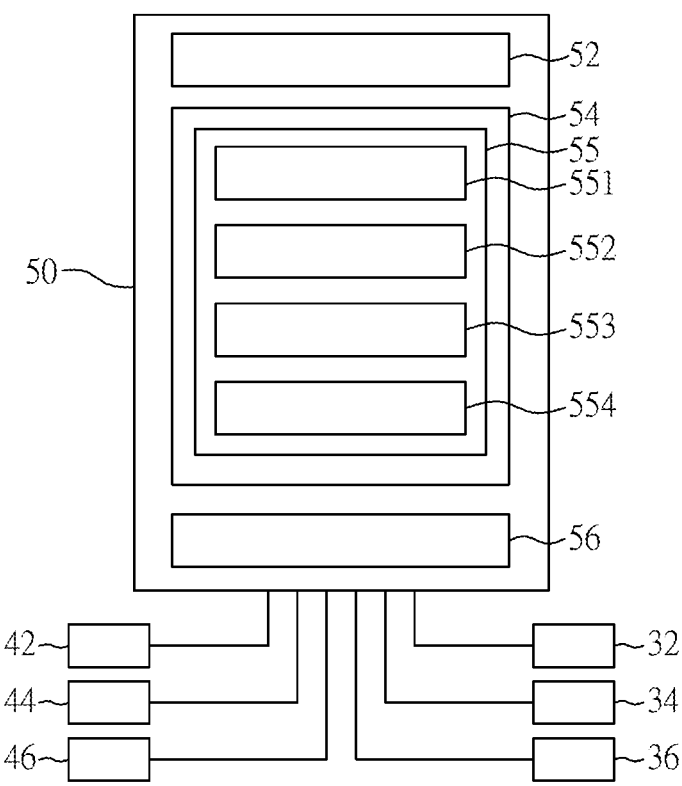
FIG. 3(D) schematically shows the microcontroller unit according to an embodiment of the present disclosure.

FIG. 3(D) schematically shows the microcontroller unit 50 according to an embodiment of the present disclosure. As shown in FIG. 3(D), the microcontroller unit 50 in this embodiment may include a central processing unit (CPU) 52, a memory 54, and an input/output (I/O) interface 56. In one embodiment, the microcontroller unit 50 is programmable, the memory 54 stores a non-transitory computer program unit 55, and the CPU 52 loads a program code from the computer program unit 55 to generate a control command, which is sent as a control signal through the I/O interface 56 to the first switch module 32, the driving signal generation module 42, and so on for carrying out a specific operation. It is noted that the foregoing description is only exemplary, while the microcontroller unit 50 may include more or less elements than described above.

In one embodiment, the computer program unit 55 has a first program code 551, a second program code 552, a third program code 553, and a fourth program code 554. The first program code 551 enables the microcontroller unit 50 to determine the presence or absence of a to-be-detected object (e.g., a user's finger) so as to determine whether or not to enter a touch control mode. If the to-be-detected object exists, the second program code 552 further enables the microcontroller unit 50 to determine the distance between the detected object and the display surface of the display device 1 according to a quantitative analysis of the distribution of electric charges over the display surface of the display device 1, e.g., by sensing the voltage on the display surface (either with the first array electrodes 22 or the second array electrodes 24) and then comparing the sensed voltage with a preset voltage. If the sensed voltage is lower than the preset voltage, the distance is determined to be greater than zero (i.e., the first distance exists); otherwise, the distance is determined to be equal to zero. If the first distance exists, the third program code 553 further enables the microcontroller unit 50 to turn on the first switch module 32 (e.g., by turning on the first transistor 321), so as to allow the first array electrodes 22 to receive the first touch driving signal D1, and then turn on the second switch module 34 (e.g., by turning on the fifth transistor 342), so as to allow the second array electrodes 24 to send the first sensing signal S1 to the first sensing module 44. If the distance is equal to zero, the fourth program code 554 further enables the microcontroller unit 50 to turn on the first switch module 32 and the second switch module 34 (e.g., by turning on the first transistor 321 and the fourth transistor 341), so as to allow the first array electrodes 22 and the second array electrodes 24 to receive the second touch driving signal D2, and then keep turning on the first switch module 32 and the second switch module 34 (e.g., by turning on the third transistor 323 and the sixth transistor 343), so as to allow the first array electrodes 22 and the second array electrodes 24 to send the second sensing signal S2 to the second sensing module 46. In other words, with the microcontroller unit 50 executing the computer program unit 55, the display device 1 can be switched between the 2D touch control mode and the 3D touch control mode according to the way a user performs touch control.

Figure 4:
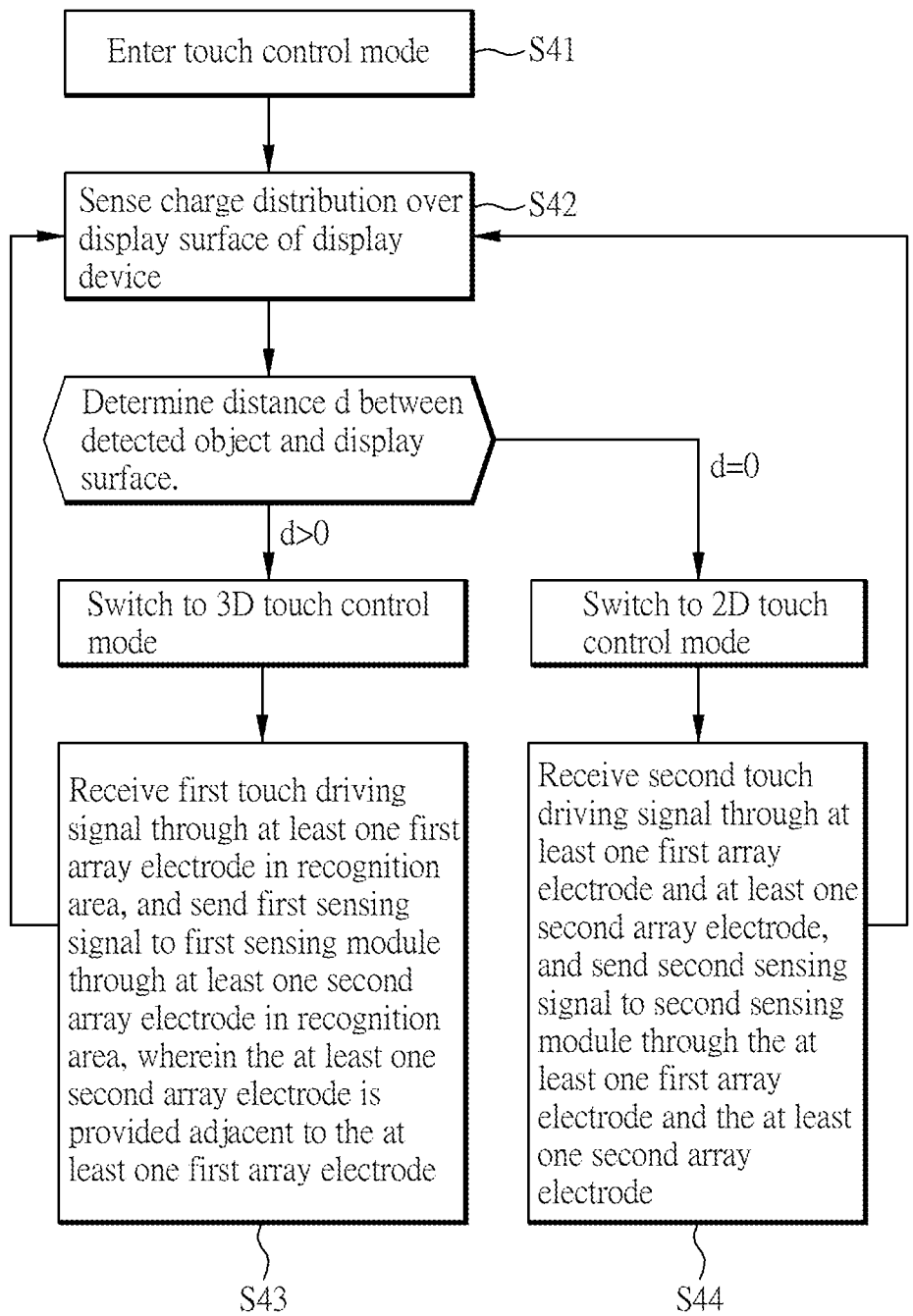
FIG. 4 is the flowchart of the method by which the display device according to an embodiment of the present disclosure switches between a 2D touch control mode and a 3D touch control mode.

Please refer to FIG. 4 in conjunction with FIG. 1, FIG. 2(C), and FIG. 3(A) to FIG. 3(D). FIG. 4 is the flowchart of the displaying method performed by the display device 1 according to an embodiment of the present disclosure. At first, the display device 1 determines the presence of a to-be-detected object and enters a touch control mode in step S41. Step S42 is performed after the detection of a to-be-detected object, in which the display device 1 senses and analyzes a quantitative distribution of electric charges on the display surface of the display device 1 so as to determine the distance d between the detected object and the display surface, wherein the distance d corresponds to the normal direction (Z direction) of the display surface of the display device 1. If the distance d is greater than zero (i.e., the first distance exists), step S43 is performed, in which the display device 1 receives the first touch driving signal D1 through the first array electrodes 22 in the recognition area 10 and sends the first sensing signal S1 through the second array electrodes 24 in the recognition area 10 that are adjacent to the first array electrodes 22 to the first sensing module 44 of the display device 1 so as to complete the sensing of a 3D touch control operation. If the distance d is equal to zero, step S44 is performed, in which the display device 1 receives the second touch driving signal D2 through the first array electrodes 22 and the second array electrodes 24, and sends the second sensing signal S2 through the first array electrodes 22 and the second array electrodes 24 to the second sensing module 46 of the display device 1 so as to complete the sensing of a 2D touch control operation. In one embodiment, and by way of example only, steps S41 to S44 can be completed in 10 milliseconds (ms) or carried out at 120 Hz (i.e., the process being completed 120 times per second). It is noted that the foregoing steps are only exemplary but not limiting.

Regarding step S41, in one embodiment, the display device 1 determines the presence or absence of a to-be-detected object in various ways, and enters the touch control mode when the to-be-detected object exists. For example, the determination may be carried out by a pressure sensing method, an optical sensing method, or a capacitive sensing method, and the like, while the disclosure is not limited thereto.

Regarding step S42, in one embodiment, the display device 1 predefines a preset voltage as a voltage on its display surface that corresponds to a certain instance of operation in the 2D touch control mode. When a to-be-detected object is subsequently detected, the display device 1 senses the voltage on its display surface through the first array electrodes 22 or the second array electrodes 24. If the voltage on the display surface is lower than the preset voltage, it is determined that the first distance, which is greater than zero, exists between the detected object and the display surface; if the voltage on the display surface is higher than or equal to the preset voltage, the distance between the detected object and the display surface is determined to be equal to zero. According to the present disclosure, the distance between the detected object and the display surface of the display device 1 can be determined by other methods as well.

In one embodiment, when the distance between the display surface and the detected object changes from zero to greater than zero (i.e., changes from a contact state to a hovering state), due to the induced capacitance between the display surface and the detected object being fast and greatly attenuated, the electric field intensity between the display surface and the detected object is in inverse proportion to the distance between the display surface and the detected object. That is, the greater the distance between the display surface and a detected object is, the lower the voltage on the display surface will be. More specifically, when a detected object moves away from the display surface in the Z direction (e.g., from a contact state to a hovering state), a medium such as air exists between the detected object and the display surface. As the relative permittivity of air (about 1.00054) is far lower than that of the display surface (about 3.9 if the display surface is made of silicon dioxide), the electric field intensity between the detected object and the display surface decreases rapidly, for example, to one third or one fourth. Therefore, a preset maximum voltage, denoted as Threshold_I(max), can be defined as the voltage that is generated on the display surface when a detected object is in contact with the display surface, and serve as the basis on which the display device 1 determines whether or not the detected object is moving away from the display surface (e.g., from a contact state to a hovering state). In one embodiment, the display device 1 is switched from the 2D touch control mode to the 3D touch control mode when the voltage on the display surface is lower than the preset maximum voltage Threshold_I(max), i.e., when Threshold_Iz<Threshold_I(max), where Threshold_Iz is the current voltage on the display surface. In one embodiment, the preset maximum voltage Threshold_I(max) is set to be higher than 0.95 V but lower than 1.05 V, i.e., 0.95 V<Threshold_I(max)<1.05 V. In one embodiment, the preset maximum voltage Threshold_I (max) is 1 V. In one embodiment, and by way of example only, the display device 1 determines whether or not a detected object is moving away from the display surface by determining whether or not the distance between the detected object and the display surface exceeds a specific value (e.g., 3~5 mm). In another embodiment, the display device 1 uses the same method to determine whether or not a detected object is in contact with the display surface.

In one embodiment, the display device 1 determines whether or not to switch from the 3D touch control mode to the 2D touch control mode by determining the acceleration of a detected object toward the display surface of the display device 1. In one embodiment, and by way of example only, the acceleration of a detected object is derived from a variation of energy between the detected object and the display surface between different time points. In one embodiment, the acceleration detected by the display device 1 of a detected object decreases when the distance between the detected object and the display surface is changed from a long one (e.g., 15 cm) to a short one (e.g., 0 cm), and once the detected object contacts the display surface, the acceleration of the detected object can be expressed as: Threshold_Sz<Threshold_S(min), where Threshold_Sz is the current acceleration of the detected object and Threshold_S(min) is the minimum acceleration threshold (i.e., the acceleration of the detected object at the precise instant when the detected object touches the display surface). In one embodiment, the minimum acceleration threshold is 0.25 m/sec. In one embodiment, a detected object generally has an acceleration higher than 1 m/sec but lower than 5 m/sec before contacting the display surface (i.e., 1 m/sec<Threshold_Sz<5 m/sec). In one embodiment, the display device 1 relies on the acceleration of a detected object to determine whether or not the detected object is moving away from the display surface.

It should be noted that the display device 1 may determine whether or not to switch to the 2D touch control mode or the 3D touch control mode using both methods described above (i.e., according to the acceleration of a detected object as well as the voltage on the display surface), while the present disclosure has no limitation in this respect.

Regarding step S43, in one embodiment, during the touch driving period, the microcontroller unit 50 sends a control signal to the control end 321*c* of the first transistor 321 of the first switch module 32 to turn on the first transistor 321, thereby allowing the first touch driving signal D1 to be transmitted through the first transistor 321 to the first array electrodes 22. In one embodiment, during the touch sensing period, the microcontroller unit 50 sends a control signal to the control end 342*c* of the fifth transistor 342 of the second switch module 34 to turn on the fifth transistor 342, thereby allowing the first sensing signal S1 to be transmitted from the second array electrodes 24 through the second transistor 342 to the first sensing module 44.

Regarding step S44, in one embodiment, during the touch driving period, the microcontroller unit 50 sends a control signal not only to the control end 321*c* of the first transistor 321 of the first switch module 32 to turn on the first transistor 321, but also to the control end 341*c* of the fourth transistor 341 of the second switch module 34 to turn on the fourth transistor 341, thereby allowing the second touch driving signal D2 to be transmitted through the first transistor 321 to the first array electrodes 22 and through the fourth transistor 341 to the second array electrodes 24. In one embodiment, during the touch sensing period, the microcontroller unit 50 sends a control signal not only to the control end 323*c* of the third transistor 323 of the first switch module 32 to turn on the third transistor 323, but also to the control end 343*c* of the sixth transistor 343 of the second switch module 34 to turn on the sixth transistor 343, thereby allowing the second sensing signal S2 to be transmitted from the first array electrodes 22 through the third transistor 323 to the second sensing module 46 and from the second array electrodes 24 through the sixth transistor 343 to the second sensing module 46.

The signal timings of the 2D touch control mode and the 3D touch control mode are described below with reference to FIG. 1 to FIG. 5(D).

Figure 5A:
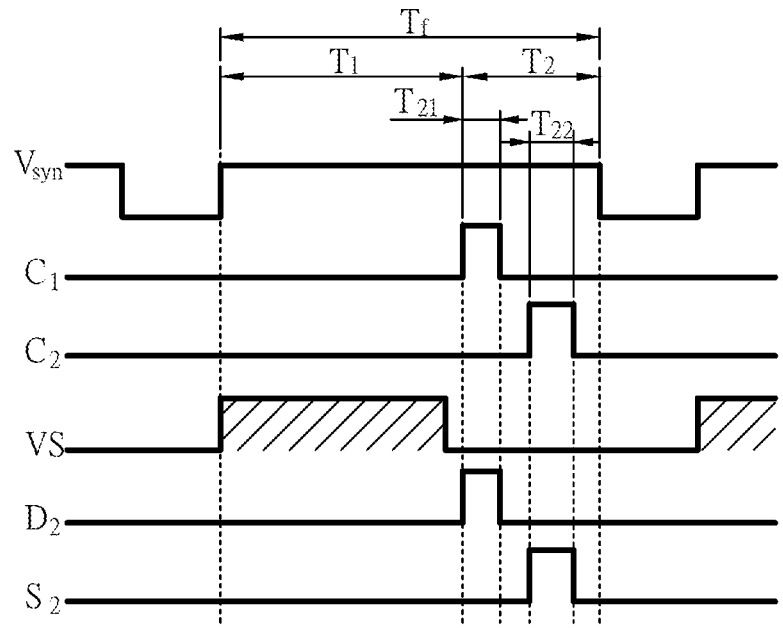
FIG. 5(A) is a timing diagram corresponding to the 2D touch control mode of the display device according to an embodiment of the present disclosure.

FIG. 5(A) is a timing diagram corresponding to the 2D touch control mode of the display device 1 according to an embodiment of the present disclosure. In this embodiment, the display device 1 displays an image and performs a touch sensing operation during a vertical synchronization period (i.e., the frame time, Tf). As shown in FIG. 5(A), a vertical synchronization period Tf may include at least one display period T1 and at least one touch control period T2, wherein the touch control period T2 may include a touch driving period T21 and a touch sensing period T22. During the display period T1, the display device 1 displays an image according to image data VS. During the touch driving period T21, the first transistor 321 of the first switch module 32 and the fourth transistor 341 of the second switch module 34 receive a first control signal C1 and thus are turned on, thereby allowing the first array electrodes 22 and the second array electrodes 24 to receive the second touch driving signal D2. During the touch sensing period T22, the third transistor 323 of the first switch module 32 and the sixth transistor 343 of the second switch module 34 receive a second control signal C2 and thus are turned on, thereby allowing the second sensing signal S2 to be transmitted from the first array electrodes 22 and the second array electrodes 24 to the second sensing module 46. In one embodiment, the seventh transistor 361 of the third switch module 36 also receives, and is turned on by, the first control signal C1 during the touch driving period T21, and the ninth transistor 363 of the third switch module 36 also receives, and is turned on by, the second control signal C2 during the touch sensing period T22, thereby allowing the second sensing signal S2 to be transmitted from the third electrodes 26 to the second sensing module 46. In one embodiment, the display period T1 is longer than the touch control period T2. In one embodiment, the display period T1 and the touch control period T2 are in a ratio of 4:1; for example, the display period T1 is 800 μs while the touch control period T2 is 200 μs. In one embodiment, the touch control period T2 further includes a buffer period, e.g., with the touch driving period T21 being 10 μs, the touch sensing period T22 being 100 μs, and the buffer period being 90 μs. In one embodiment, the vertical synchronization period Tf includes a plurality of display periods T1 and a plurality of touch control periods T2, and the touch control periods T2 alternate with the display periods T1; for example, there is a touch control period T2 between two adjacent display periods T1. However, there is no limitation on the sequence of the at least one display period T1 and the at least one touch control period T2.

Figure 5B:
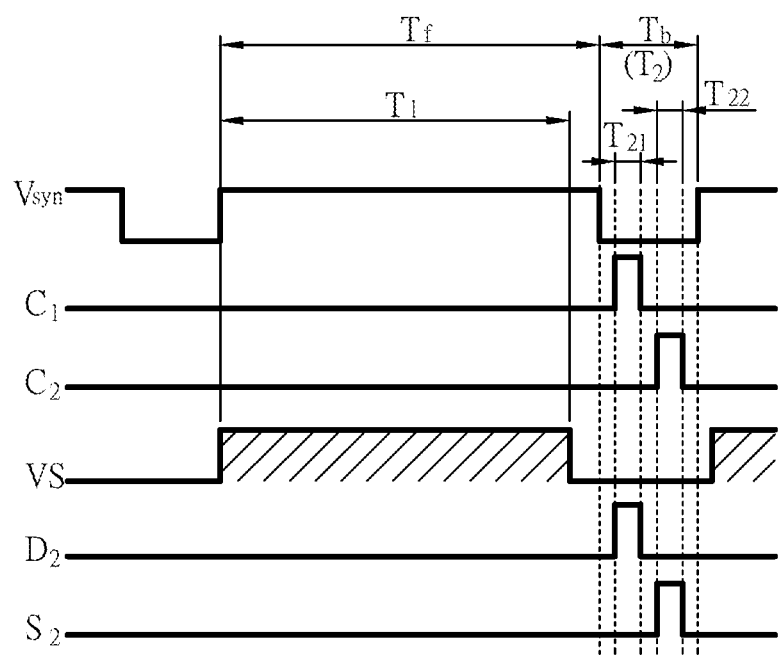
FIG. 5(B) is a timing diagram corresponding to the 2D touch control mode of the display device according to another embodiment of the present disclosure.

FIG. 5(B) is a timing diagram corresponding to the 2D touch control mode of the display device 1 according to another embodiment of the present disclosure. In this embodiment, the display device 1 displays an image during a vertical synchronization period Tf and senses 2D touch control operations during a blanking time Tb. As shown in FIG. 5(B), a vertical synchronization period Tf may include at least one display period T1, and a blanking time Tb may include at least one touch control period T2, wherein the touch control period T2 may include a touch driving period T21 and a touch sensing period T22. The display period T1, the touch driving period T21, and the touch sensing period T22 work in a way similar to that shown in the embodiment described with reference to FIG. 5(A) and thus a detailed description therefor is deemed unnecessary. In one embodiment, and by way of example only, the display period T1 is 13.3 ms. In one embodiment, and by way of example only, the touch control period T2 is 3.3 ms. In one embodiment, the touch control period T2 further includes a buffer period. However, there is no limitation on the sequence of the at least one display period T1 and the at least one touch control period T2.

Figure 5C:
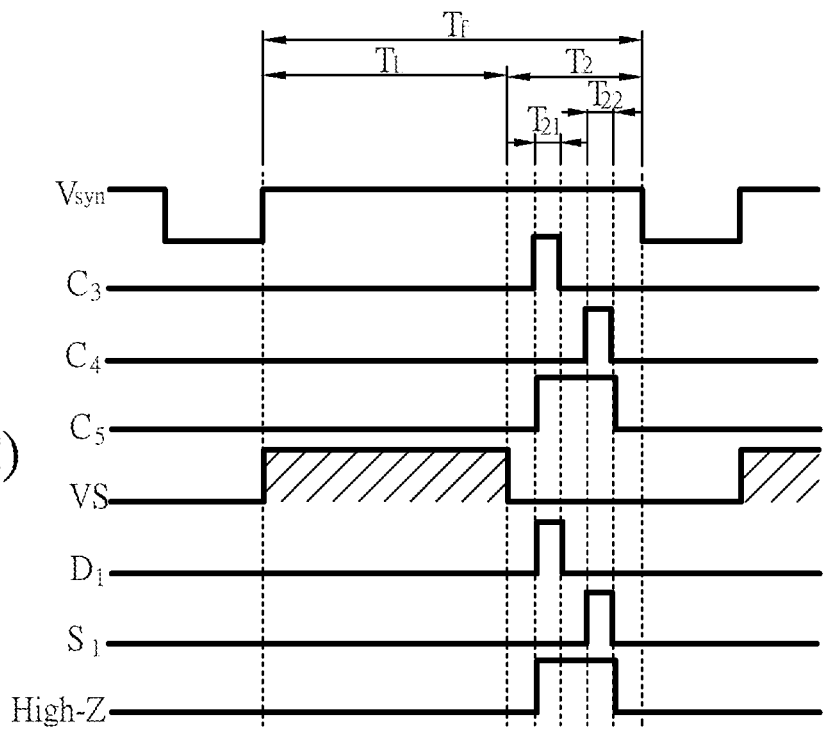
FIG. 5(C) is a timing diagram corresponding to the 3D touch control mode of the display device according to an embodiment of the present disclosure.

FIG. 5(C) is a timing diagram corresponding to the 3D touch control mode of the display device 1 according to an embodiment of the present disclosure. In this embodiment, the display device 1 displays an image and performs a touch sensing operation during a vertical synchronization period Tf. As shown in FIG. 5(C), a vertical synchronization period Tf may include at least one display period T1 and at least one touch control period T2, wherein the touch control period T2 may include a touch driving period T21 and a touch sensing period T22. During the display period T1, the display device 1 displays an image according to image data VS. During the touch driving period T21, the first transistor 321 of the first switch module 32 receives a third control signal C3 and thus is turned on, thereby allowing the first array electrodes 22 to receive the first touch driving signal D1. During the touch sensing period T22, the fifth transistor 342 of the second switch module 34 receives a fourth control signal C4 and thus is turned on, thereby allowing the first sensing signal S1 to be transmitted from the second array electrodes 24 to the first sensing module 44. In one embodiment, the third switch module 36 receives, and is turned on by, a fifth control signal C5 during the touch driving period T21 and the touch sensing period T22, thereby allowing the third electrodes 26 to receive a high impedance signal High-Z. In one embodiment, the display period T1 is longer than the touch control period T2. In one embodiment, the display period T1 and the touch control period T2 are in a ratio of 4:1; for example, the display period T1 is 800 μs while the touch control period T2 is 200 μs. In one embodiment, the touch control period T2 further includes a buffer period T23, e.g., with the touch driving period T21 being 10 μs, the touch sensing period T22 being 100 μs, and the buffer period being 90 μs. In one embodiment, the vertical synchronization period Tf includes a plurality of display periods T1 and a plurality of touch control periods T2, and the touch control periods T2 alternate with the display periods T1; for example, there is a touch control period T2 between two display periods T1. There is no limitation on the sequence of the at least one display period T1 and the at least one touch control period T2. In one embodiment, the first control signal C1, the second control signal C2, the third control signal C3, the fourth control signal C4, and the fifth control signal C5 have the same voltage polarity, although the control signals may also vary in voltage polarity.

Figure 5D:
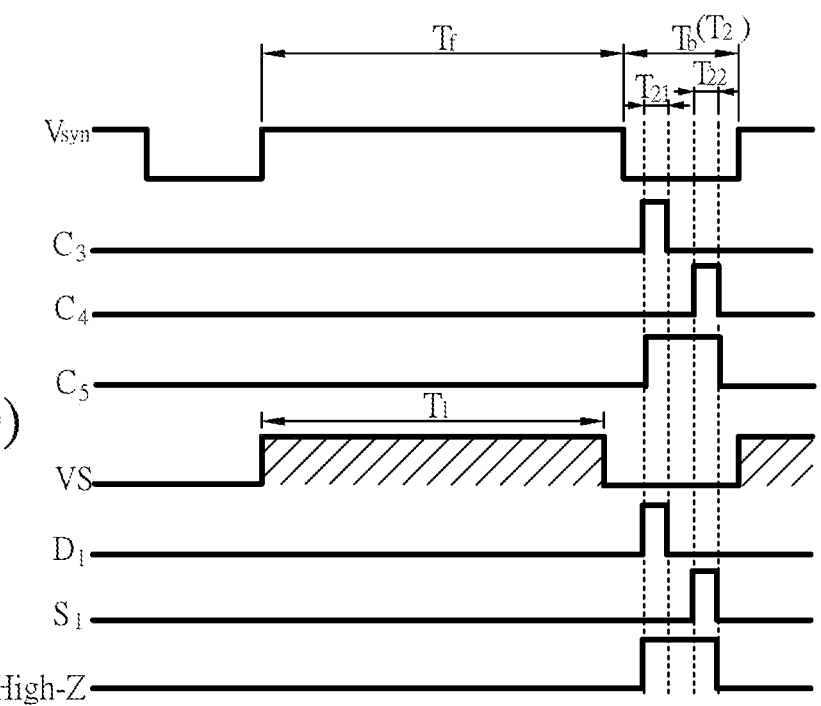
FIG. 5(D) is a timing diagram corresponding to the 3D touch control mode of the display device according to another embodiment of the present disclosure.

Please refer to FIG. 5(D) in conjunction with FIG. 1 to FIG. 5(C). FIG. 5(D) is a timing diagram corresponding to the 3D touch control mode of the display device 1 according to another embodiment of the present disclosure. In this embodiment, the display device 1 displays an image during a vertical synchronization period Tf and performs a touch sensing operation during a blanking time Tb, which is between two vertical synchronization periods Tf. As shown in FIG. 5(D), a vertical synchronization period Tf may include at least one display period T1, and a blanking time Tb may include at least one touch control period T2, wherein the touch control period T2 may include a touch driving period T21 and a touch sensing period T22. The display period T1, the touch driving period T21, and the touch sensing period T22 operate in a way similar to that shown in the embodiment described with reference to FIG. 5(C) and thus a detailed description therefor is deemed unnecessary. In one embodiment, and by way of example only, the display period T1 is 13.3 ms. In one embodiment, and by way of example only, the touch control period T2 is 3.3 ms. In one embodiment, the touch control period T2 further includes a buffer time T23. However, there is no limitation on the sequence of the at least one display period T1 and the at least one touch control period T2.

Thus, the first switch module 32, the second switch module 34, the first array electrodes 22, and the second array electrodes 24 are configured to not only provide the disclosed display device 1 with an image displaying function, a 2D touch control function, and a 3D touch control function, but also enable the display device 1 to switch between the 2D touch control mode and the 3D touch control mode according to the way a user touches the display device 1, without having to rely on additional elements that are conventionally required in a peripheral region of the display panel, thereby solving the problem of the prior art.

Moreover, given the increasing industrial demand for specially shaped touch display devices, the array electrodes must also be available in various shapes to cope with the specially shaped display surfaces of those display devices. However, as array electrodes of different shapes react differently to the same driving voltage, the criterion of touch control over a recognition area with array electrodes of different shapes may vary from one electrode shape to another, making it difficult to determine the location of a touch accurately. The display device disclosed herein can solve this problem, too.

Figure 6A:
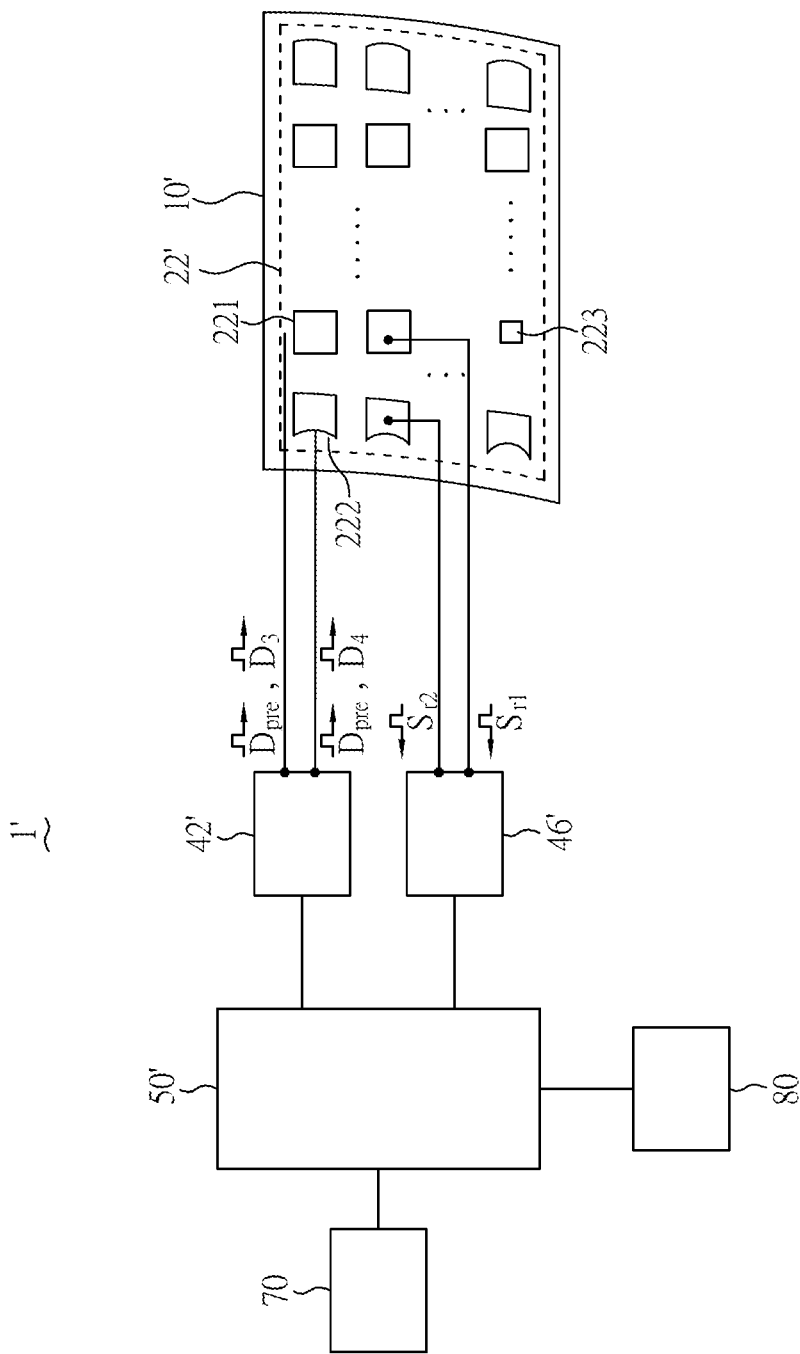
FIG. 6(A) is a top view of the display device according to still another embodiment of the present disclosure.

FIG. 6(A) is a top view of the display device 1' according to another embodiment of the present disclosure. The display device 1' in FIG. 6(A) is defined as being disposed on the XY plane and having a display surface facing the Z direction. As shown in FIG. 6(A), the display device 1' in this embodiment may also include a recognition area 10' with a plurality of first array electrodes 22'. The first array electrodes 22' may include a plurality of first sub-electrodes 221 each having a first shape, and a plurality of second sub-electrodes 222 each having a second shape. For example, each first sub-electrode 221 has a rectangular shape, and each second sub-electrode 222 has a non-rectangular or free shape. In another embodiment, the first array electrodes 22' include a plurality of first sub-electrodes 221 each having a first area, a plurality of second sub-electrodes 222 each having a second area, and a plurality of third electrodes 223 each having a third area. For example, the first sub-electrodes 221, the second sub-electrodes 222, and the third electrodes 223 may have the same shape or have different shapes respectively; and the first area, the second area, and the third area may be different from one another. Thus, the first array electrodes 22' can be used in a display device 1' or display panel having a rectangular, polygonal, curved-surface, wavy, or other shape. The display device 1' in this embodiment may further include a driving signal generation module 42', a second sensing module 46', a microcontroller unit 50', and a comparator 70. The driving signal generation module 42' is configured to provide signals to the first sub-electrodes 221 and the second sub-electrodes 222. The second sensing module 46' is configured to receive signals from the first sub-electrodes 221 and the second sub-electrodes 222. The microcontroller unit 50' may be electrically connected to the driving signal generation module 42', the second sensing module 46', and the comparator 70. In one embodiment, the driving signal generation module 42' has the same function as the driving signal generation module 42 in the embodiment shown in FIG. 1, but the two modules may have the same or different elements. The second sensing module 46' and the microcontroller unit 50' may have the same functions as the second sensing module 46 and the microcontroller unit 50 in the embodiment in FIG. 1 respectively, although their elements may or may not be the same.

In one embodiment, the microcontroller unit 50' is configured to enable the driving signal generation module 42' to send a preset driving signal Dpre to the first array electrodes 22' for allowing the first sub-electrodes 221 to generate a first reaction signal Sr1 corresponding to the preset driving signal Dpre, and allowing the second sub-electrodes 222 to generate a second reaction signal Sr2 corresponding to the preset driving signal Dpre. As the first sub-electrodes 221 and the second sub-electrodes 222 are of different shapes, the first reaction signal Sr1 and the second reaction signal Sr2 may have different voltages. In one embodiment, and by way of example only, the microcontroller unit 50' is configured as described with reference to FIG. 3(D).

In one embodiment, the second sensing module 46' is configured to receive the first reaction signal Sr1 and the second reaction signal Sr2, and transmit the first reaction signal Sr1 and the second reaction signal Sr2 to the microcontroller unit 50' and the comparator 70. In one embodiment, and by way of example only, the second sensing module 46' is configured as described with reference to FIG. 3(C).

In one embodiment, the comparator 70 is configured to compare the first reaction signal Sr1 with a plurality of threshold levels so as to determine the threshold level (hereinafter referred to as the first threshold level) corresponding to the first reaction signal Sr1, and the microcontroller unit 50' is configured to enable the driving signal generation module 42' to provide the first sub-electrodes 221 with a third touch driving signal D3 corresponding to the first threshold level (i.e., to provide the third driving signal D3 according to the first reaction signal Sr1). The comparator 70 may also compare the second reaction signal Sr2 with a plurality of threshold levels so as to determine the threshold level (hereinafter referred to as the second threshold level) corresponding to the second reaction signal Sr2, and the microcontroller unit 50' enables the driving signal generation module 42' to provide the second sub-electrodes 222 with a fourth touch driving signal D4 corresponding to the second threshold level (i.e., to provide the fourth driving signal D4 according to the second reaction signal Sr2). The third touch driving signal D3 and the fourth touch driving signal D4 may be different voltage signals; for example, the third touch driving signal D3 and the fourth touch driving signal D4 may have different pulse widths or amplitudes or be amplified with different gains respectively. In one embodiment, the microcontroller unit 50' uses a lookup table 80 to find the touch driving signal corresponding to a threshold level. In one embodiment, the microcontroller unit 50' provides a plurality of threshold levels to the comparator 70 for use by the comparator 70 in making comparisons. In one embodiment, and by way of example only, the comparator 70 is implemented as a circuit and is integrated into the microcontroller unit 50'.

Figure 6B:
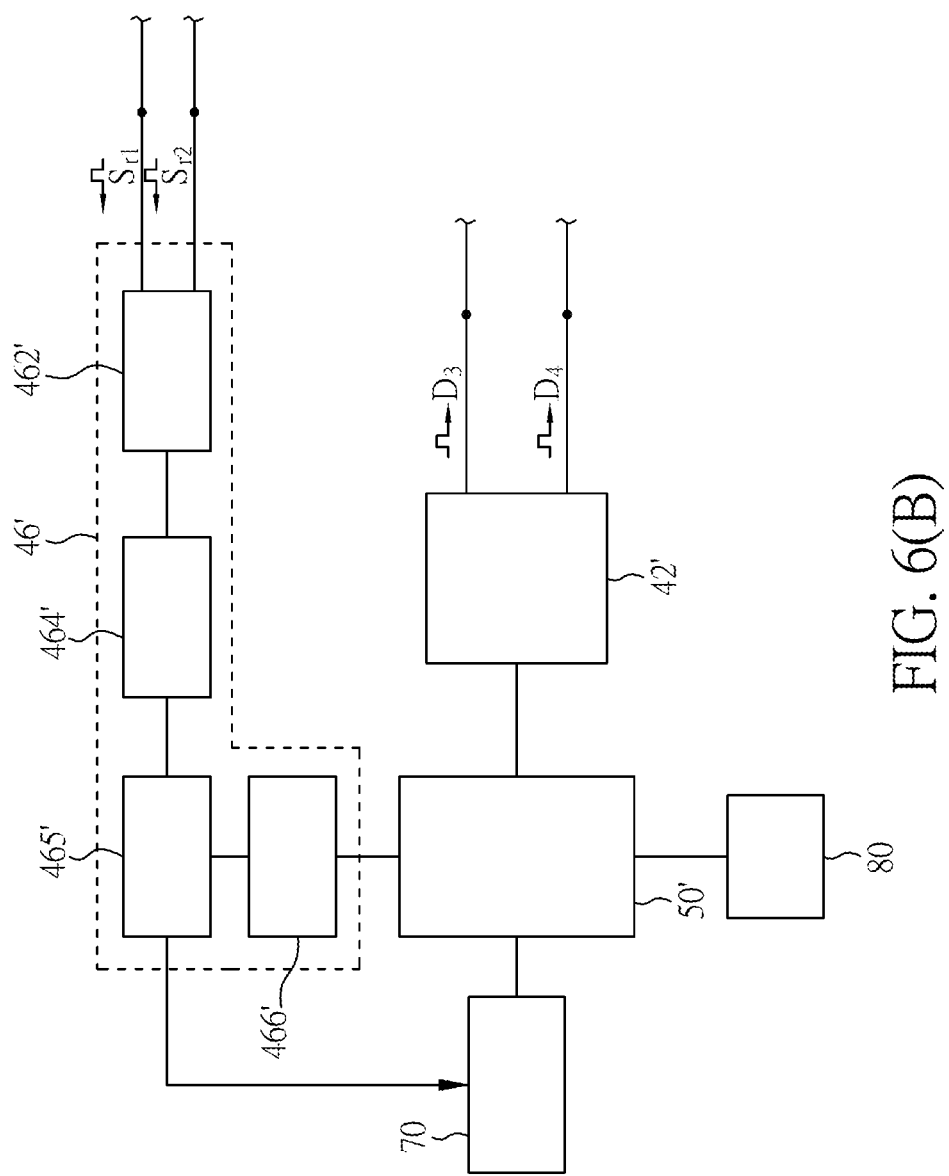
FIG. 6(B) schematically shows the driving signal generation module, the second sensing module, the microcontroller unit, and the comparator in FIG. 6(A).

FIG. 6(B) schematically shows the driving signal generation module 42', the second sensing module 46', the microcontroller unit 50', and the comparator 70 in FIG. 6(A). As shown in FIG. 6(B), the second sensing module 46' may be electrically connected to the microcontroller unit 50' and the comparator 70, and the microcontroller unit 50' may be electrically connected to the comparator 70, the lookup table 80, and the driving signal generation module 42'. In this embodiment, the second sensing module 46' may include an AFE circuit 462', an ADC 464', a register 465', and an ALU 466', wherein the AFE circuit 462' is electrically connected to the ADC 464', the ADC 464' is electrically connected to the register 465', the register 465' is electrically connected to the ALU 466' and the comparator 70, and the ALU 466' is electrically connected to or integrated into the microcontroller unit 50'. In one embodiment, the AFE circuit 462' receives the first reaction signal Sr1 or the second reaction signal Sr2 and transmits the first reaction signal Sr1 or the second reaction signal Sr2 to the ADC 464'; the ADC 464' converts the first reaction signal Sr1 or the second reaction signal Sr2 from an analog format to a digital one and transmits the converted first reaction signal Sr1 or second reaction signal Sr2 to the register 465'; and the register 465' records the electric potential of the converted first reaction signal Sr1 or second reaction signal Sr2 and transmits the recorded electric potential to the comparator 70, so as to allow the comparator 70 to determine the threshold level of the first reaction signal Sr1 or the second reaction signal Sr2, and allow the driving signal generation module 42' to provide a driving voltage corresponding to the threshold level. Thus, depending on their respective reactions, the differently shaped first array electrodes 22' will be applied with different driving voltages to enable consistent use of the criterion of touch control, thereby solving the problem of inaccurate determination of touch positions. In one embodiment, and by way of example only, the second sensing module 46' may receive a sensing signal from the first array electrodes 22' and determine the location of the touch or identify the touch control gesture through computation by the ALU 466'. In one embodiment, the ALU 466' is integrated into the microcontroller unit 50'.

In one embodiment, the display device 1' shown in FIG. 6(A) and FIG. 6(B) is applied to the embodiment shown in FIG. 1 to FIG. 5(D); that is, the display device 1 may have a free shape but is still capable of switching between the 2D touch control mode and the 3D touch control mode. For example, the embodiment shown in FIG. 6(A) and FIG. 6(B) can be integrated with that shown in FIG. 1 so that, before sensing a user's 2D touch control operation, the touch driving voltage corresponding to each of the differently shaped first array electrodes 22 and second array electrodes 24 will be determined so as to provide each electrode of a particular shape with the corresponding touch driving voltage or, before sensing a user's 3D touch control operation, the touch driving voltage corresponding to each of the differently shaped first array electrodes 22 will be determined so as to provide each first array electrode 22 of a particular shape with the corresponding touch driving voltage. A person skilled in the art should be aware of integrating the circuitry of the embodiment shown in FIG. 6(A) and FIG. 6(B) with that shown in FIG. 1 (e.g., by configuring the first sensing module 44 in the same way as the second sensing module 46' in FIG. 6(B) to enable 3D touch control via differently shaped array electrodes), and thus a detailed description therefor is deemed unnecessary.

The display device 1 disclosed herein may be, but is not limited to, a liquid crystal display (LCD), an OLED display, a micro-LED display, a quantum dot-LED (Q-LED) display, or a flexible display. Furthermore, a display device or touch-display device made according to the embodiments disclosed herein can be used in any electronic devices in the art that require multi-touch control, such as displays, mobile phones, laptop computers, video cameras, still cameras, music players, mobile navigation devices, television sets, automotive dashboards, center consoles, electronic rear-view mirrors, overhead displays, antenna devices, and other electronic devices that are designed to display images.

The disclosed display device not only can switch between the 2D touch control mode and the 3D touch control mode according to the way a user touches the display device, but also can do so without having to increase the area of the peripheral region of the display device, thereby contributing to cost reduction. In addition, the disclosed display device can be applied to freely shaped display devices or display panels without causing inaccurate determination of touch positions.

The embodiments provided herein serve illustrative purposes only. The scope of patent protection sought by the applicant is defined by the appended claims rather than limited to the disclosed embodiments.

What is claimed is:
1. A display device comprising:
   a recognition area including:
      a plurality of first array electrodes; and
      a plurality of second array electrodes disposed adjacent to the first array electrodes;
   a first sensing module, receiving a first sensing signal from at least one of the second array electrodes; and
   a second sensing module, receiving a second sensing signal from at least one of the first array electrodes and at least one of the second array electrodes;
   wherein, when a first distance between a detected object and the display device is greater than zero, the first array electrodes receive a first touch driving signal, and the at least one of the second array electrodes sends the first sensing signal to the first sensing module;

wherein, when a second distance between the detected object and the display device is equal to zero, the first array electrodes and the second array electrodes receive a second touch driving signal, the at least one of the first array electrodes and the at least one of the second array electrodes send the second sensing signal to the second sensing module.

2. The display device of claim 1, further comprising a first switch module electrically connected to at least one of the first array electrodes; and a second switch module electrically connected to at least one of the second array electrodes, wherein the first sensing module is electrically connected to the second switch module, the second sensing module is electrically connected to the first switch module and the second switch module, the first switch module has a first end portion and a second end portion, the second switch module has a third end portion and a fourth end portion, the first end portion is electrically connected to at least one of the first array electrodes, the third end portion is electrically connected to at least one of the second array electrodes, the first sensing module is electrically connected to the fourth end portion, and the second sensing module is electrically connected to the second end portion and the fourth end portion.

3. The display device of claim 2, wherein the second switch module further comprises a plurality of thin-film transistors, each thin film transistor having a first end, a second end and a control end, in which the first ends of the thin film transistors are electrically connected to at least one of the second array electrodes, one of the second ends of the thin film transistor receives the first touch driving signal or the second touch driving signal, and the other said second ends are respectively electrically connected to the first sensing module and the second sensing module.

4. The display device of claim 2, further comprising a third switch module having a fifth end portion electrically connected to at least one third electrode and a sixth end portion electrically connected to a driving signal generation module, the first sensing module, and the second sensing module or to any two of the driving signal generation module, the first sensing module and the second sensing module.

5. The display device of claim 1, further comprising a display surface, wherein the first distance is greater than 0 cm and smaller than or equal to 15 cm along a normal direction of the display surface.

6. The display device of claim 1, further comprising at least one third electrode disposed adjacent to two of the second array electrodes, wherein the at least one third electrode is a floating electrode or is configured to receive a high impedance signal, receive a ground signal or receive a common voltage signal.

7. The display device of claim 1, wherein the first array electrode further comprises a first sub-electrode of a first shape and a second sub-electrode of a second shape, and the first shape is different from the second shape.

8. The display device of claim 7, wherein the first sub-electrode generates a first reaction signal corresponding to a preset driving signal, the second sub-electrode generates a second reaction signal corresponding to the preset driving signal, and the first reaction signal and the second reaction signal have different voltages.

9. The display device of claim 1, further comprising a sensing electrode layer and a driving electrode layer, wherein at least one of the second array electrodes is disposed in the sensing electrode layer, at least one of the first array electrodes is disposed in the driving electrode layer, and the sensing electrode layer and the driving electrode layer have different height positions in a normal direction of a display surface of the display device.

10. The display device of claim 9, further comprising a protective layer disposed on a topmost end of the display device in the normal direction, wherein the sensing electrode layer is disposed between the driving electrode layer and the protective layer.

11. The display device of claim 9, wherein the second array electrodes do not overlap with the first array electrodes when the display device is viewed in the normal direction.

12. The display device of claim 8, further comprising a driving signal generation module configured to provide a third driving signal to the first sub-electrode according to the first reaction signal and provide a fourth driving signal to the second sub-electrode according to the second reaction signal, wherein the third driving signal is different from the fourth driving signal.

13. The display device of claim 8, further comprising a microcontroller unit, a driving signal generation module, a comparator, an analog front end circuit for receiving the first reaction signal and the second reaction signal, an analog-to-digital converter, and a register, wherein the analog front end circuit is electrically connected to the analog-to-digital converter, the analog-to-digital converter is electrically connected to the register, the register is electrically connected to the comparator, the comparator is electrically connected to the microcontroller unit, and the microcontroller unit is electrically connected to the driving signal generation module.

14. The display device of claim 13, wherein the driving signal generation module is implemented as a circuit or the driving signal generation module is integrated into the microcontroller unit.

15. The display device of claim 1, wherein the display device displays at least one image during a display period, and during a touch control period, the first array electrodes receive the first touch driving signal and the second array electrodes send the first sensing signal to the first sensing module, where the display period is longer than the touch control period.

16. The display device of claim 1, wherein the display device is switched between a 2D touch control mode when there is the second distance between a display surface of the display device and a detected object, and a 3D touch control mode when there is the first distance between the display surface of the display device and the detected object.

17. The display device of claim 16, wherein the 3D touch control mode has operation periods including a touch driving period and a touch sensing period and, in the 3D touch control mode, the first array electrodes receive a first touch driving signal during the touch driving period and the second array electrodes send a first sensing signal to the first sensing module during the touch sensing period.

18. The display device of claim 16, wherein the 2D touch control mode has operation periods including a touch driving period and a touch sensing period and, in the 2D touch control mode, the first array electrodes and the second array electrodes receive a second touch driving signal during the touch driving period and send a second sensing signal to the second sensing module during the touch sensing period.

19. The display device of claim 1, further comprising a microcontroller unit into which a non-transitory computer program unit is loaded for controlling the display device, the computer program unit comprising:

a program code for determining whether there is the first distance or the second distance between the detected object and the display device according to distribution of electric charges on a display surface of the display device when the detected object exists;

when there is the first distance, using the first array electrodes to receive a first touch driving signal, and using the second array electrodes to send the first sensing signal to the first sensing module; and when there is the second distance, using the first array electrodes and the second array electrodes to receive a second touch driving signal, and using the first array electrodes and the second array electrodes to send the second sensing signal to the second sensing module.

20. A display method performed by a display device, the method comprising the steps of:

determining whether there is a first distance greater than zero or a second distance equal to zero between a detected object and the display surface according to distribution of electric charges on a display surface of the display device;

when there is the first distance, at least one first array electrode in a recognition area of the display device receiving a first touch driving signal, and at least one second array electrode in the recognition area of the display device sending a first sensing signal to a first sensing module of the display device, wherein the at least one second array electrode is disposed adjacent to the at least one first array electrode; and when there is the second distance, the at least one first array electrode and the at least one second array electrode receiving a second touch driving signal, and the at least one first array electrode and the at least one second array electrode sending a second sensing signal to a second sensing module of the display device.

* * * * *